US012313727B1

(12) United States Patent
Das et al.

(10) Patent No.: US 12,313,727 B1
(45) Date of Patent: May 27, 2025

(54) OBJECT DETECTION USING TRANSFORMER BASED FUSION OF MULTI-MODALITY SENSOR DATA

(71) Applicant: Zoox, Inc., Foster City, CA (US)

(72) Inventors: Subhasis Das, San Mateo, CA (US); Ruijie He, Boston, MA (US); Xinyu Xu, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 219 days.

(21) Appl. No.: 18/162,672

(22) Filed: Jan. 31, 2023

(51) Int. Cl.
*G01S 13/86* (2006.01)
*G06N 3/0464* (2023.01)
*G06N 3/0499* (2023.01)
*G06T 17/00* (2006.01)

(52) U.S. Cl.
CPC ............ *G01S 13/86* (2013.01); *G06N 3/0464* (2023.01); *G06N 3/0499* (2023.01); *G06T 17/00* (2013.01)

(58) Field of Classification Search
None
See application file for complete search history.

(56) References Cited

U.S. PATENT DOCUMENTS

| 11,921,824 B1* | 3/2024 | Hester | G06N 3/045 |
|---|---|---|---|
| 11,971,955 B1* | 4/2024 | Chakraborty | G06F 3/04845 |
| 12,110,042 B1* | 10/2024 | Hoang | G06N 3/044 |
| 2021/0192762 A1* | 6/2021 | Guan | G06T 15/06 |
| 2021/0287438 A1* | 9/2021 | Son | G06F 3/011 |
| 2021/0403050 A1* | 12/2021 | Gan | B60W 60/0027 |
| 2022/0019810 A1* | 1/2022 | Farber | H04N 7/18 |
| 2022/0180056 A1* | 6/2022 | Hong | G06F 9/547 |
| 2022/0292314 A1* | 9/2022 | Sminchisescu | G06V 40/107 |
| 2023/0031702 A1* | 2/2023 | Li | G06V 10/82 |
| 2023/0100300 A1* | 3/2023 | Curto | B29C 64/386 |
| | | | 345/419 |

(Continued)

OTHER PUBLICATIONS

Alammar, J., "The Illustrated Transformer", Jay Alammar: Visualizing machine learning one concept at a time [blog], updated Jul. 2020, pp. 1-30, URL: https://jalammar.github.io/illustrated-transformer/ [retrieved on Feb. 3, 2023].

(Continued)

*Primary Examiner* — Mohammad J Rahman
(74) *Attorney, Agent, or Firm* — Lee & Hayes, P.C.

(57) ABSTRACT

Disclosed are techniques for combining data using transformer-based machine learning models. In some examples, a first transformer is used to combine a first dataset with a second dataset. The results are then combined with a third dataset, using a second transformer. Each dataset can represent data from a different sensor modality. The transformers compute scores based on queries and apply the scores to values. The first dataset can be used to generate queries for the first transformer, and the values for the first transformer can be derived from the second dataset. Similarly, the third dataset can be used to generate queries for the second transformer, and the values for the second transformer can be derived from the output of the first transformer. The output of the second transformer is therefore a combination of all three datasets and can be used for object detection, for example, determining three-dimensional boundaries of objects.

20 Claims, 15 Drawing Sheets

(56) References Cited

U.S. PATENT DOCUMENTS

| | | | | |
|---|---|---|---|---|
| 2023/0237783 A1* | 7/2023 | Banerjee | ............... | G01S 17/86 |
| | | | | 382/103 |
| 2023/0243658 A1* | 8/2023 | Yilmaz | ............... | G01C 21/005 |
| | | | | 701/400 |
| 2023/0410490 A1* | 12/2023 | Zhang | .................. | G01S 13/867 |
| 2024/0096074 A1* | 3/2024 | Okorn | .................. | G06N 3/0455 |
| 2024/0161470 A1* | 5/2024 | Sminchisescu | ........ | G06V 20/64 |

OTHER PUBLICATIONS

Kosar, V., "Cross-Attention in Transformer Architecture", Vaclav Kosar's Software & Machine Learning Blog, updated Dec. 30, 2022, pp. 1-6, URL: https://vaclavkosar.com/ml/cross-attention-in-transformer-architecture#:~:text=Cross%20attention%20is%3A,e.g.%20text%2C%20image%2C%20sound [retrieved on Feb. 3, 2023].

Tan, D., "A Hands-On Application of Homography: IPM", Towards Data Science, Jul. 24, 2020, pp. 1-8, URL: https://towardsdatascience.com/a-hands-on-application-of-homography-ipm-18d9e47c152f.

Vaswani, A. et al., "Attention Is All You Need", 31st Conference on Neural Information Processing Systems (NIPS 2017), Dec. 6, 2017, pp. 1-15, URL: https://arxiv.org/abs/1706.03762v5.

\* cited by examiner

600

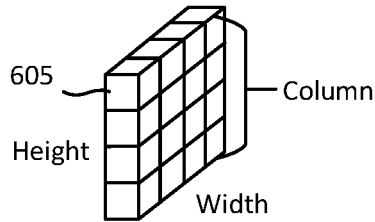

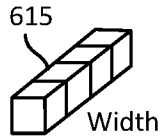

| | |
|---|---|
| Collapse An Image Feature Map Along A Vertical (Height) Dimension To Form Condensed Image Features | 602 |

↓

| | |
|---|---|
| Convert The Condensed Image Features Into Keys And Values | 604 |

↓

| | |
|---|---|
| Generate A Fused Feature Map Using The Keys And Values Together With Queries Derived From A Lidar Or Radar Feature Map | 606 |

↓

| | |
|---|---|
| Generate Lidar Or Radar Queries From The Fused Feature Map For Input To A Transformer | 608 |

FIG. 6

OBJECT DETECTION USING TRANSFORMER BASED FUSION OF MULTI-MODALITY SENSOR DATA

BACKGROUND

Machine learning has been applied to many tasks, including analysis of an image to detect objects contained in the image. One example of a machine learning model that has been used for this purpose is a neural network. Neural networks employ interconnected layers of nodes that can perform different operations such as convolution, correlation, and matrix multiplication. Convolutional network networks (CNN) are sometimes used for image analysis. CNNs can be trained to produce output interferences indicating locations of objects of interest within an image. Some applications of machine learning involve more than one type of input data. Autonomous driving is one example. An autonomous vehicle may be equipped with several sensor types. As such, data from different sensor modalities may be available for processing by a machine learning model executing on-board an autonomous vehicle. Each sensor may provide a different perspective on the surrounding environment, and one sensor modality may offer additional information not available from another sensor modality or vice versa. Therefore, combined processing of data from different sensor modalities may result in more accurate detection of objects, e.g., lower false positive rate, compared to processing the data independently. However, combined processing of such data can be challenging, especially during real-time operations such as autonomous driving or other situations where the amount of time available for processing sensor data is limited.

BRIEF DESCRIPTION OF THE DRAWINGS

Various embodiments in accordance with the present disclosure will be described with reference to the drawings, in which:

FIG. 6 is a flow diagram of an example process for converting image data into top-down view format;

DETAILED DESCRIPTION

Figure 1:
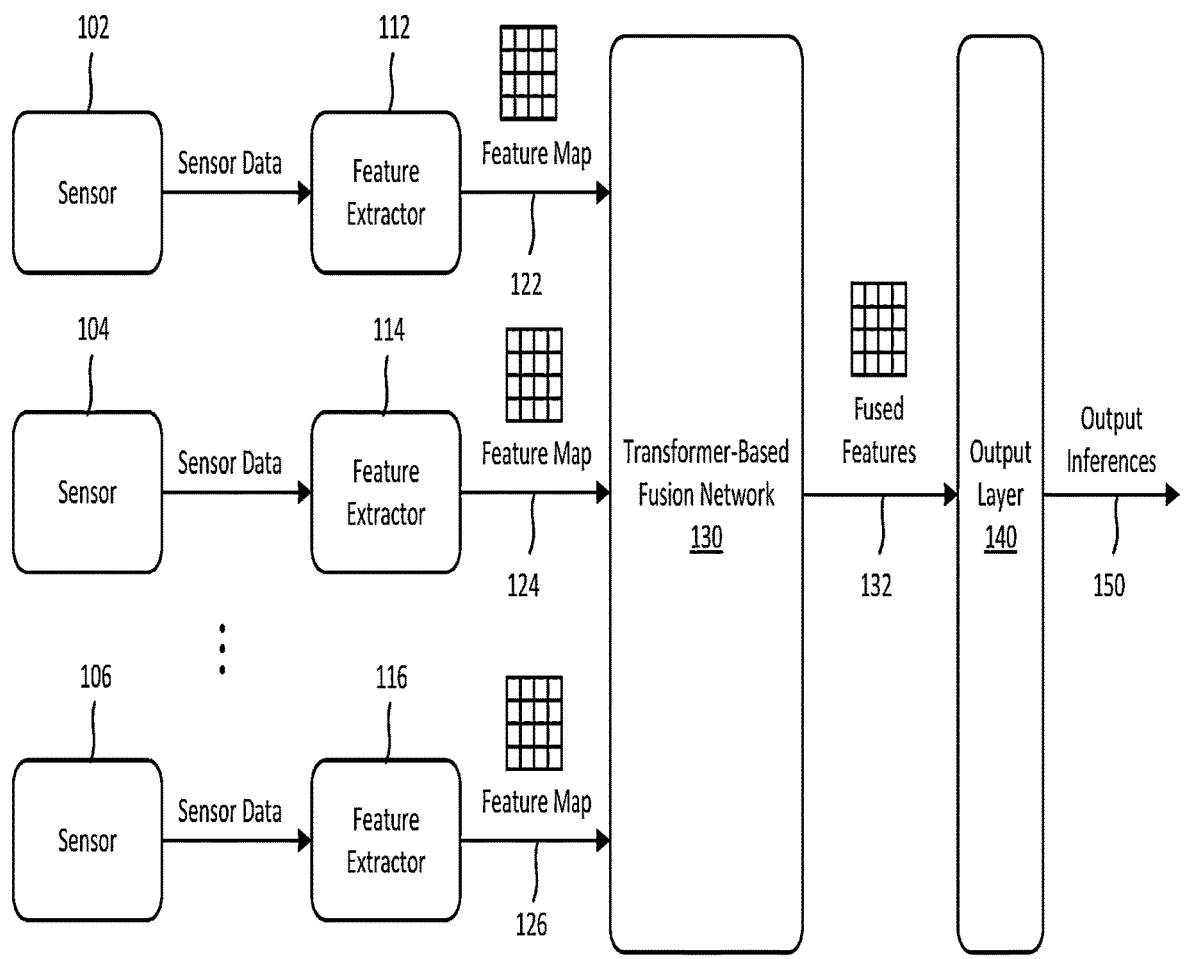
FIG. 1 shows an example of a process for detecting objects represented in sensor data.

This disclosure describes methods, apparatuses, and systems for detecting objects represented in data from different sensor modalities. In particular, techniques are described for determining three-dimensional (3D) boundaries of objects represented in camera images, radar data, and lidar (light detection and ranging) data, through combining such sensor data using a transformer-based machine learning model. Although described with respect to specific sensor modalities that are sometimes employed in the automotive context, the techniques disclosed herein are applicable to other sensor modalities.

A transformer is a specific machine learning architecture implemented using a neural network. Transformers have certain advantages over earlier machine learning models such as recurrent neural networks (RNNs) and convolutional neural networks (CNNs). Transformers can be applied to tasks where input sequences are converted into output sequences. A transformer generally includes an encoder that processes an input sequence to generate input to a decoder of the transformer. The processing performed by the transformer typically involves an attention mechanism that transforms data using queries, keys, and values as the data travels through the encoder or the decoder. The roles of the queries, keys, and values are described in further detail below.

The attention mechanism in a transformer uses an attention function, of which different types are available including additive attention functions and dot-product (multiplicative) attention functions. Examples are disclosed herein in connection with dot-product attention. However, other attention functions may also be suitable for use with the techniques disclosed. The operation of the transformer in the disclosed examples differs from that of a traditional transformer, in part, because the queries, keys, and values are not necessarily derived from the same input sequence. Instead, as explained below, the queries, keys, and values may be generated using different sensor modalities (e.g., camera, lidar, and radar) so that the output of the transformer includes contributions from each of the sensor modalities. In this manner, data from different sensor modalities may be combined using attention. However, the use of attention across different input sources (referred to herein as cross-attention), in particular across data from different sensor modalities, does not preclude use of self-attention, e.g., using queries, keys, and values from a single sensor modality. In some implementations, a transformer may employ cross-attention and self-attention at different stages of processing in an encoder, a decoder, or both an encoder and a decoder. Additionally, techniques are described for converting data not formatted according to a top-down perspective, e.g., an input sequence representing a camera image, into top-down view data as part of generating the input (e.g., queries) to a transformer. More generally, various techniques can be applied to place sensor data into a format suitable for processing by a transformer. These and other techniques relating to combining sensor data and detection of objects in 3D space using combined sensor data will be described in reference to the accompanying drawings.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 is a flow diagram of a process 100 for detecting objects represented in sensor data. The process 100 operates on data from multiple sensors, e.g., sensors 102, 104, and 106. In the example shown, each of the sensors 102, 104, 106 may correspond to a different sensor modality. For example, the sensors may include at least one instance of a camera, at least one instance of a radar sensor, and at least one instance of a lidar sensor. The output of each sensor is processed using a corresponding feature extractor. As shown, sensor data from the sensor 102 is input to a feature extractor 112, sensor data from the sensor 104 is input to a feature extractor 114, and sensor data from the sensor 106 is input to a feature extractor 116.

Each feature extractor can be implemented using a corresponding machine learning model that has been trained on training data representative of the data provided by its corresponding sensor. The feature extractors are configured to generate feature maps for input to a transformer-based fusion network 130. For example, feature extractor 112 may generate a feature map 122, feature extractor 114 may generate a feature map 124, and feature extractor 116 may generate a feature map 126, and the feature maps 122, 124, and 126 may be input to the fusion network 130 for concurrent processing. As such, the feature extractors 112, 114, 116 may operate as backbone feature extractors that perform some preliminary processing of the sensor data to identify features of interest.

A feature map can be an encoded representation of the data (e.g., sensor data) input to a feature extractor. Each feature map can include a set of embeddings, e.g., embedding vectors having a certain length, where each entry in an embedding vector is assigned a numerical value representing a particular attribute of the sensor data. The embeddings can be organized into a 2D or 3D matrix of cells (or more generally a tensor). Each cell may represent a corresponding spatial location within the environment captured by a sensor. The embeddings may have reduced dimensionality relative to the sensor data from which the embeddings are generated. The feature maps 122, 124, and 126 produced by the feature extractors may differ in dimensionality. For example, the cells of some feature maps may be indexed in 2D space while cells in other feature maps may be indexed in 3D space. Additionally, feature maps may differ in terms of viewing perspective. For example, a camera may capture the environment from a different perspective than a lidar or radar sensor. In order to combine different feature maps, the feature maps may be placed into a common data space having the same spatial dimensions and representing the same viewing perspective. For example, as discussed below, each feature map operated on by a transformer can be in top-down view. In some instances, a feature map may already be in the common data space. For example, one or more of the feature extractors 112, 114, and 116 may be configured to produce top-down view feature maps. In other instances, a feature map may be converted into top-down view, either directly or through combining the feature map with another feature map that is in top-down view.

When combining sensor data in a deterministic manner (as opposed to using machine learning), it is often necessary to align the sensor data to each other. Alignment may involve determining correspondences between spatial locations in one dataset and spatial locations in another dataset. For example, a deterministic algorithm for combining camera data with lidar data may require that a corresponding spatial location in a lidar point cloud be identified for each individual pixel in a camera image. The transformer-based approach described herein avoids having to perform alignment between data of different sensor modalities. Alignment is unnecessary because a transformer can use attention to determine which features (e.g., embeddings) in one feature map have the highest correlation to features in another feature map. The attention can be applied as long as the datasets being combined are of the same size, that is, the same spatial dimensions. As a simple example, a transformer may be configured to operate on 700×500 matrices, where 700 is the number of cells in the height or row dimension, and 500 is the number of cells in the width or column dimension. However, a feature map obtained from a feature extractor (either directly or after additional processing) may be of a different size. A feature map that is not the size expected by a transformer can be resized by changing its resolution using resampling (upsampling or downsampling). For example, a 256×512 matrix of features can be upsampled to a 700×500 matrix.

Resampling can be performed deterministically, e.g., using an interpolation (expansion) or decimation (compression) algorithm. In some embodiments, resampling is performed using machine learning operations. For instance, the process 100 may involve resampling of one or more feature maps by a CNN prior to processing by a transformer. Such a CNN can be part of the transformer-based fusion network 130 and may include one or more layers configured to perform nearest neighbor interpolation, bilinear interpolation, bicubic interpolation, transposed convolution, or some other CNN-based resampling method.

In addition to changing feature map size, the sizes of the features themselves can be modified if needed. For example, if a transformer is configured to operate on vectors of length 8, but the embedding vectors in a feature map are length 10, the embedding vectors can be mapped to new vectors of length 8. Similar to resampling, this can be performed with machine learning operations, e.g., using a fully-connected layer.

Fusion network 130 includes one or more transformers (not shown in the figure) and implements a machine learning pipeline that combines the feature maps into a single feature map for processing by an output layer 140. For example, the fusion network 130 may combine the feature maps 122, 124, 126 into an output feature map corresponding to a set of fused features 132 that include embeddings derived from each of the feature maps 122, 124, 126. As with the feature extractors 112, 114, and 116, the fusion network 130 can be pre-trained using training data. In this instance, the training configures the fusion network 130 to extract relevant features from each of the feature maps for combining.

As discussed above, a transformer generally includes an encoder and a decoder. Various transformer architectures suitable for use as a transformer of the fusion network 130 will be described in reference to later drawings. The encoder and the decoder may each include one or more neural network layers through which data is processed in sequence to generate the fused features 132. For example, the encoder and/or the decoder may include at least one cross-attention layer to apply attention across different sensor modalities. The fusion network 130 may include additional neural network layers that condition the input of the fusion network 130 for processing by the transformer(s), e.g., a CNN that performs resampling, as discussed above. In another example, discussed below in conjunction with FIG. 2, the fusion network 130 may optionally include an image transformer that converts an image feature map into the same viewing perspective as that of a lidar feature map and a radar feature map, e.g., top-down view.

Output layer 140 may also be a trained machine learning component. Since the identification of relevant features (e.g., features representing objects of interest) has already been performed by the time the data reaches the output layer 140, the output layer 140 can generally be implemented with fewer sub-layers and less complexity compared to the feature extractors 112, 114, 116 or the fusion network 130. The output produced by the output layer 140 may correspond to inferences regarding the locations of objects observed by the sensors 102, 104, 106. In particular, the output layer 140 may produce output inferences 150 indicating where an object is located within the fused features 132 and, in some implementations, what class/category the object belongs to. As an example, the output inferences 150 may indicate that a vehicle has been detected and a bounding box around the borders of the vehicle.

It is possible to use transformers to apply self-attention to each of the feature maps 122, 124, and 126 individually, for example, so that three sets of features are produced for concurrent input to the output layer 140 instead of a single set of fused features. However, performing object detection based on a single set of fused features produced using attention across different sensor modalities has certain advantages compared to relying on self-attention or other methods of processing data from different modalities independently. For instance, although it is expected that some of the feature maps produced by the feature extractors will include more data about certain objects than other feature maps, using self-attention alone may lead to discarding of useful data when the feature maps are processed. As a concrete example, a camera may capture objects at a farther distance than a lidar sensor. If the locations of objects represented in the camera feature map are ignored when determining which features in the lidar feature map likely correspond to objects, this may cause relevant lidar features to be discounted (e.g., weighted less heavily) or discarded altogether when the lidar feature map is processed through a self-attention transformer. Therefore, the object detection performance of the lidar features may be worse as a consequence of failure to take the camera features into consideration. Likewise, relevant camera features may be discounted or discarded based on failure to take lidar features into consideration.

Figure 2:
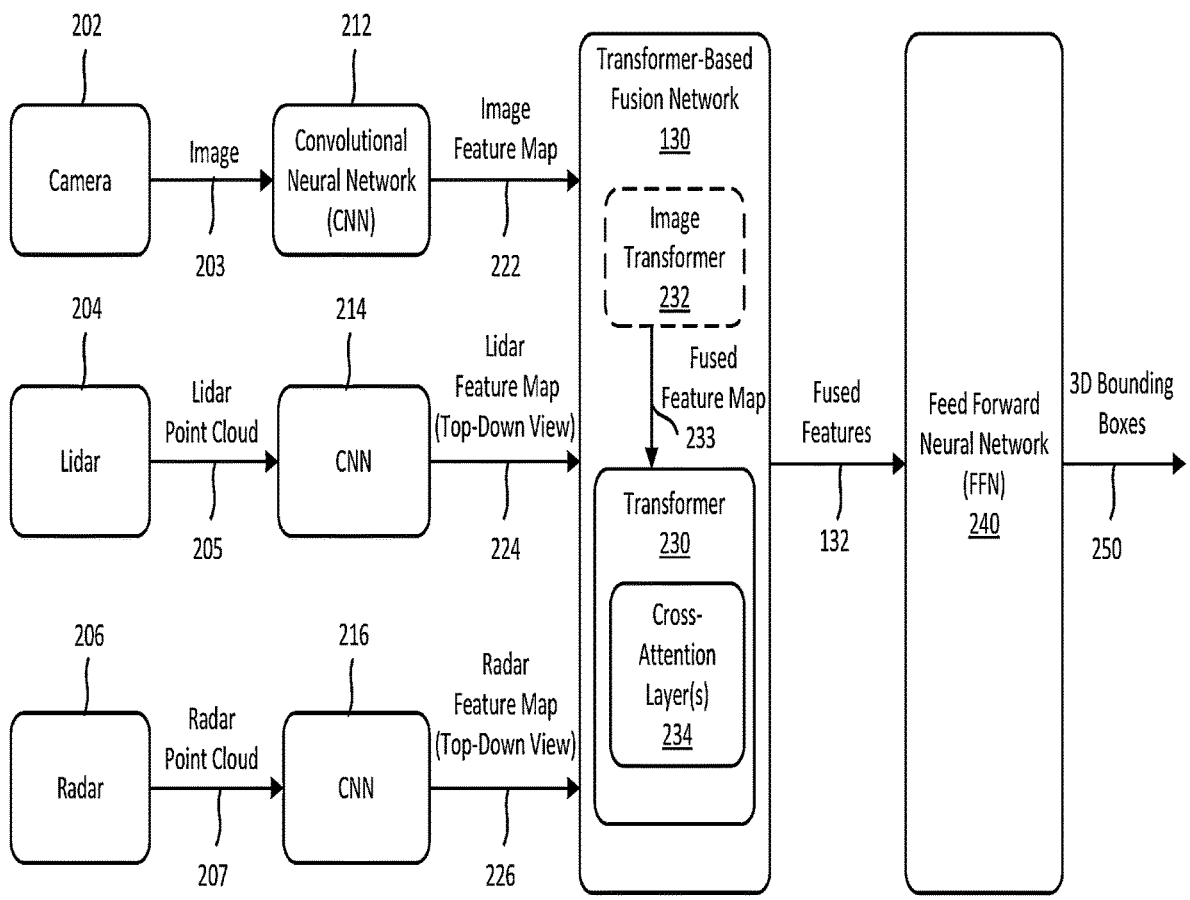
FIG. 2 shows an example of machine learning components configured according to the process depicted in FIG. 1.

FIG. 2 is a flow diagram of a system 200 with machine learning components that implement functionality described above with reference to FIG. 1. In the example of FIG. 2, the system 200 includes a camera 202, a lidar sensor 204, and a radar sensor 206. Camera 202 is configured to capture images of a physical environment. In some implementations, the sensors are mounted on an autonomous vehicle. The autonomous vehicle may include an on-board controller that determines actions to be performed autonomously (e.g., driving maneuvers, routing planning and navigation), based on detection of objects in the surrounding environment. The autonomous vehicle may include multiple cameras in different mounting locations and facing different directions. As such, each camera may have a different perspective of the environment. For example, camera 202 can be a front-facing camera oriented to capture a scene ahead of the vehicle.

Camera 202 generates an image 203 as input to a convolutional neural network (CNN) 212. The CNN 212 can implement a feature extractor as described above in reference to FIG. 1. In particular, the CNN 212 may be configured to generate an image feature map 222 using the image 203. The image feature map 222 can include embeddings representing features of interest, e.g., features associated with various classes of objects. To configure the CNN 212 to generate image feature maps, the CNN 212 can be trained on example images and labeled output associated with the example images. The labeled output may correspond to ground truth images that have been labeled manually. For example, each training image may be annotated by a human to include a bounding box around an object and a tag indicating the object's class (e.g., vehicle, road, pedestrian, etc.).

As used herein, a "bounding box" can be any indication of the borders around an object. In the case of a camera image, a bounding box can be a 2D box. The bounding box for an object represented in radar or lidar data can be a 3D box. Further, bounding boxes are not restricted to being rectangular but can instead be any geometric shape. In some instances, a bounding box may approximate the surface curvature of an object.

The system 200 (e.g., a vehicle system) may include multiple cameras. Depending on implementation, each camera may be provided with a separate CNN or share a CNN with one or more additional cameras. For example, CNN 212 may be configured to operate on a composite image generated by stitching the image 203 together with an image from a second camera.

Image feature map 222 is formatted according to the perspective of the camera 202 and based on the manner in which the image data is digitally encoded. For example, the image 203 may be a color image containing pixels with red-green-blue (RGB) values. As such, the image feature map 222 may include embeddings representing color values, and the embeddings may be arranged into a 2D matrix in the camera domain.

Lidar sensor 204 generates a lidar point cloud 205, which can be a set of points in 3D space. The points can be represented, for example, as voxels in a 3D matrix, where each voxel is either occupied or unoccupied depending on whether a lidar signal was reflected back to the lidar sensor 204 from the corresponding physical location. The lidar point cloud 205 is input to a CNN 214. The CNN 214 can operate as a feature extractor to produce a lidar feature map 224. The CNN 214 can be trained in a similar manner to the CNN 212, using example lidar point clouds and corresponding labeled output. Because the lidar point cloud is 3D, the CNN 214 can also generate the lidar feature map as a 3D feature map. However, as shown in FIG. 2, the lidar feature map can be in top-down view, sometimes referred to as bird's eye view (BEV). The top-down view represents the environment as seen looking down, e.g., from a vantage point above a vehicle. Whether the lidar feature map is 2D or 3D may depend on implementation and the target use case. As will be explained, using a top-down view for lidar and radar feature maps is advantageous when combining lidar and radar data with camera data because images captured from a camera perspective (e.g., image 203) can be converted to top-down view so that the data from each of these sensor modalities is arranged in essentially the same format.

It should be noted that even when sensor-derived features are expressed in top-down view, the features themselves are not necessarily two-dimensional. For example, each cell in a top-down view feature map can correspond to an (x, y) coordinate on a 2D grid, but the cell can contain an n-dimensional embedding vector representing multiple attributes, possibly including attributes that have spatial dependency in the height (z) direction. Thus, each cell in a top-down view feature map can be treated as being a pillar (expressed in the form of a tensor) that is located on the 2D plane of the top-down view feature map and has a certain height, with the height being zero in the case of an empty cell. As mentioned earlier, one objective of the sensor fusion processing is to generate a combined set of features from which the boundaries of objects can be detected in 3D space. Arranging the features according to the same data space, e.g., as top-down view feature maps with the same height and width, facilitates this processing since the features will share a common viewing perspective and frame of reference.

Radar sensor 206 generates a radar point cloud 207. As with the lidar point cloud 205, the radar point cloud 207 can be a 3D point cloud. Alternatively, the radar point cloud 207 can be 2D. The radar point cloud 207 is input to a CNN 216. The CNN 216 can be configured, through pre-training, to generate radar feature maps in top-down view, e.g., a radar feature map 226.

In the example of FIG. 2, the fusion network 130 includes an optional image transformer 232 and a transformer 230 having one or more cross-attention layers 234. The image transformer 232 is configured to convert the image feature map 222 into top-down view for processing by the transformer 230. In some implementations, the image transformer 232 also combines the converted image feature map with a feature map from another sensor modality to generate a fused feature map 233. The fused feature map 233 may, for example, represent image features combined with lidar features or image features combined with radar features. By contrast, the fused features 132 represent features from all three sensor modalities: camera, lidar, and radar. Like the transformer 230, the image transformer 232 can incorporate an attention mechanism. Alternatively, the image transformer 232 can be configured to generate the fused feature map 233 in a deterministic manner, without the aid of transformer attention. For instance, the image transformer 232 may be configured to convert the image feature map 222 into top-down view using inverse perspective mapping. In examples where the image transformer 232 is omitted, the image feature map 222 can be input directly to the transformer 230. However, inclusion of the image transformer 232 may reduce the implementation complexity of the transformer 230 as well as the amount of training done on the transformer 230.

In FIG. 2, the output layer is realized using a feed forward neural network 240, also known as a feed forward network (FFN). An FFN is a neural network with no recurrent connections. Nodes in an FFN pass their output forward to the nodes of the next layer without feeding the output back to the instant layer or any earlier layers. In some instances, an FFN may be implemented as a single neural network layer, e.g., a fully-connected layer. The FFN 240 can be trained on example fused features and corresponding labeled (ground truth) fused features. In some implementations, the machine learning components of the entire system are jointly trained using end-to-end training. Thus, the CNNs 212, 214, 216, the fusion network 130, and the FFN 240 may be trained concurrently to update, via back-propagation and loss functions, the machine learning parameters (e.g., weights of a neural network) used in these components. In other implementations, at least some of the machine learning components may be trained independently.

FFN 240 is configured to produce 3D bounding boxes 250 corresponding to the output inferences 150 in FIG. 1. The bounding boxes 250 represent the boundaries of objects in three-dimensional space and can be generated for one or more classes of objects. Examples of objects that the FFN 240 can be trained to detect include vehicles (and subclasses of vehicles), pedestrians, trees, buildings, traffic lights, and/or the like. The bounding boxes 250 can be subjected to downstream processing by one or more system components to determine an action to perform based on the boundaries of any objects that are detected. For example, an autonomous vehicle system may use the bounding boxes 250 to plan and execute a driving maneuver to maintain a safe course along a planned path of travel. The autonomous vehicle can receive updated bounding boxes based on processing of subsequently captured sensor data to adjust planned actions or plan additional actions in consideration of the states of detected objects, e.g., where the objects are located in relation to the vehicle and how the objects are moving.

Figure 3:
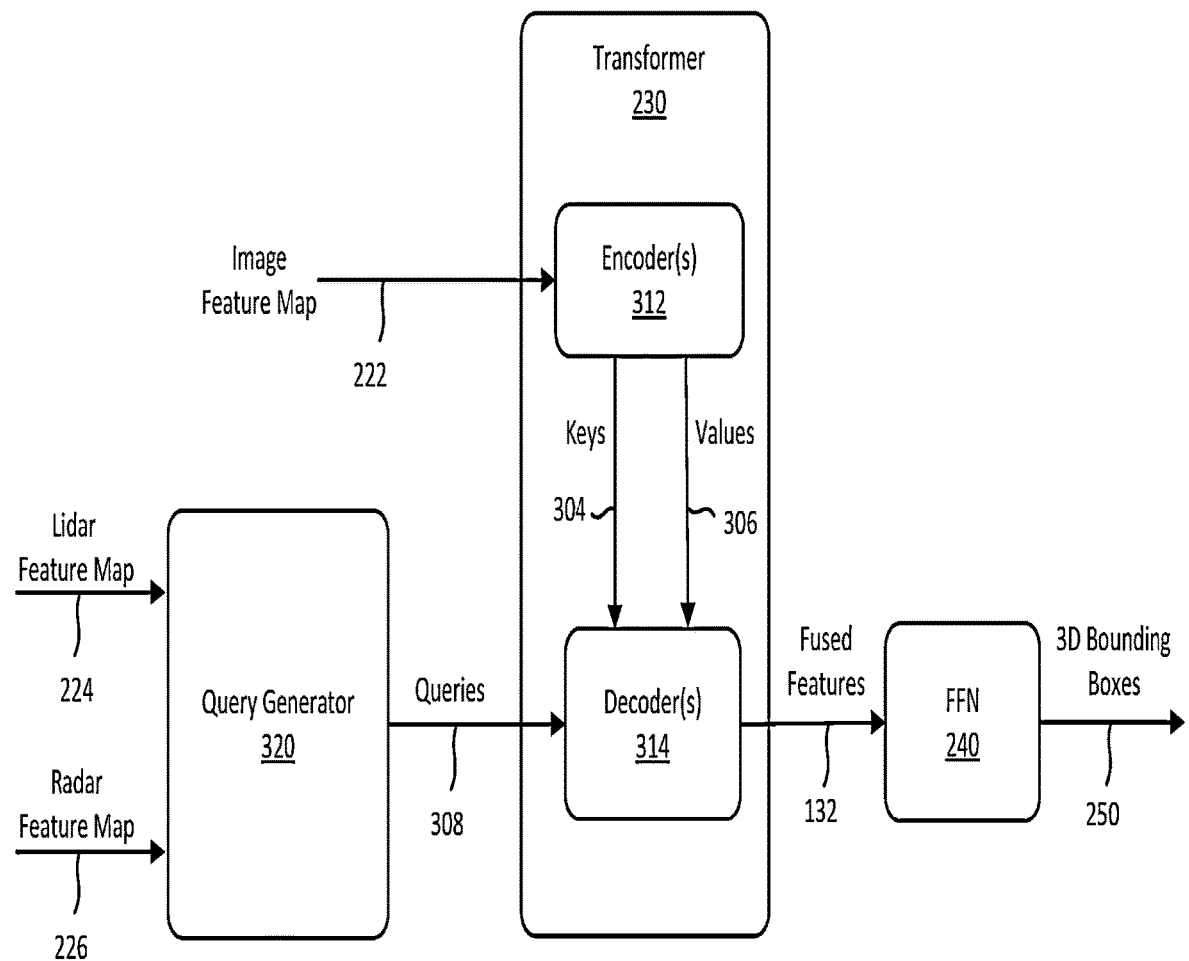
FIG. 3 shows an example implementation of the system depicted in FIG. 2.

FIG. 3 shows an example system 300 including machine learning components configured in accordance with the functionality described above in connection with FIG. 2. The system 300 corresponds to an implementation in which camera data, lidar data, and radar data are combined concurrently, using the attention mechanism of the transformer 230 and without the optional image transformer 232. In the example of FIG. 3, the attention mechanism is provided through one or more encoders 312 and one or more decoders 314. For example, the transformer 230 may include a stack of encoders that are coupled in sequence. The first encoder in the encoder stack may receive the image feature map 222 to generate the input to the next encoder. The output of the last encoder in the encoder stack includes keys 304 and values 306, which form part of the input to the decoder(s) 314.

Similarly, the transformer 230 may include a stack of decoders that are coupled in sequence. The input to the first decoder in the decoder stack includes the keys 304 and the values 306. As described below in connection with FIG. 8, keys and values may be supplied to each decoder in a decoder stack so that every decoder in the decoder stack is configured to apply attention across sensor modalities. The decoder(s) 314 also receive queries 308 from a query generator 320. The queries 308 can be input to the first decoder in the decoder stack.

Figure 9:
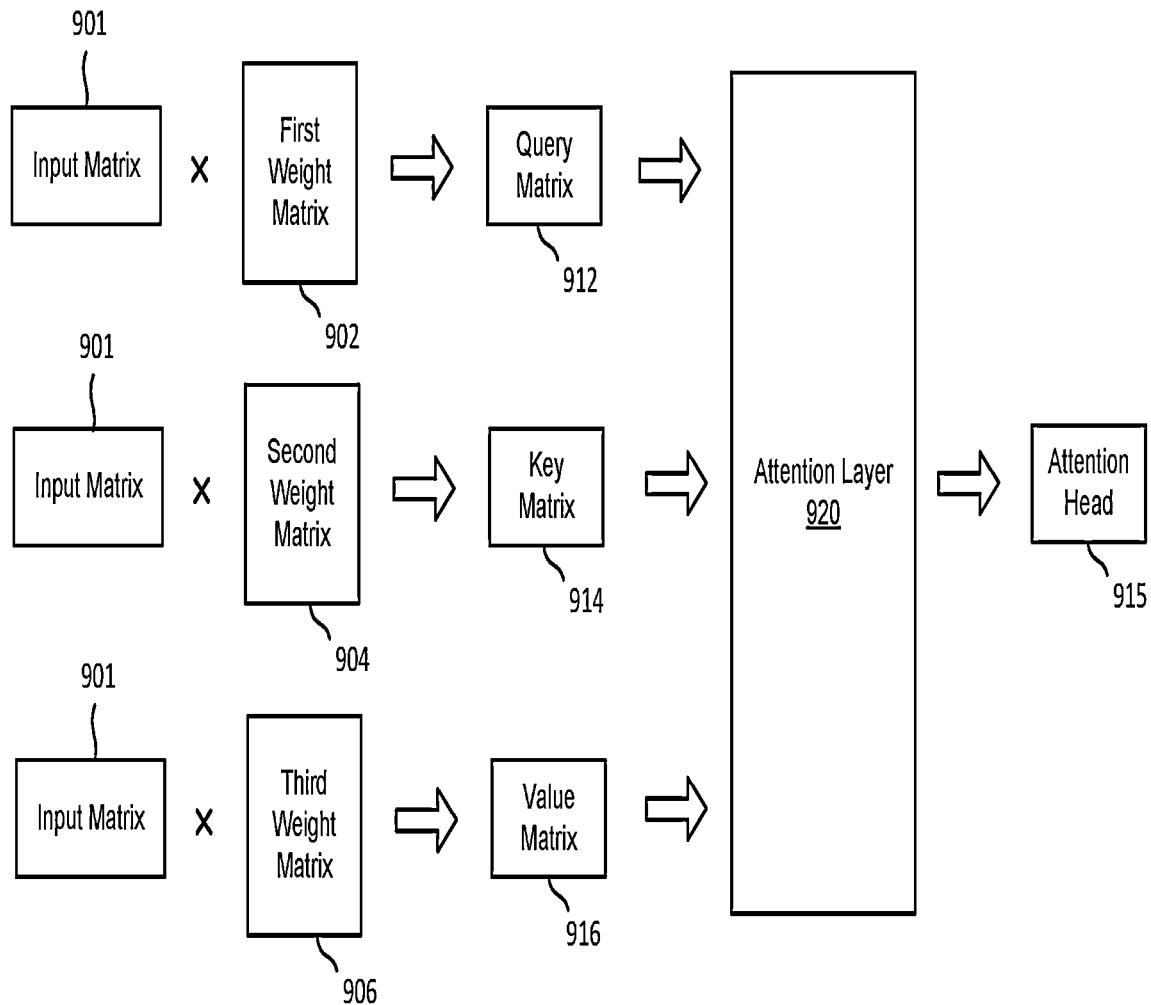
FIG. 9 shows an example of single-headed attention.

Query generator 320 generates the queries 308 based on the lidar feature map 224 and the radar feature map 226. Query generation may involve identifying features that are likely to represent objects of interest (e.g., objects belonging to a predefined class) and applying weights to convert the identified features into queries, e.g., a set of query vectors organized into a matrix. The keys 304 and the values 306 can also be generated by applying weights to features. FIG. 9 (discussed below) provides an overview of how queries, keys, and values can be generated using matrix multiplication. As mentioned above, the feature extractors responsible for generating the initial feature maps may be configured to perform preliminary processing of the sensor data to identify features of interest. Thus, the feature maps 222, 224, and 226 may already include embeddings associated with potential locations of objects. The query generation process may involve refining the feature map(s) from which the queries are derived (e.g., lidar feature map 224 and radar feature map 226) to identify a subset of features that most likely correspond to objects. A set of weights can then be applied to this subset of features to generate the queries 308.

In general, the format of the queries dictates the format of the transformer output, e.g., the fused features 132. In order to generate the fused features 132 in a format suitable for input to the FFN 240, the fused features can be organized as a tensor in top-down view or according to some other predefined feature space. A top-down view divides the surrounding environment into a 2D grid of cells. The 2D grid may be oriented along the lateral and longitudinal axes (e.g., x and y) of a vehicle in which the sensors are mounted. However, each cell may carry additional information about the height (e.g., z) dimension. As such, the 3D bounding boxes 250 can be determined when the fused features 132 are in top-down view. Because the lidar feature map 224 and the radar feature map 226 can be output from their respective feature extractors in top-down view format, the lidar feature map 224 and the radar feature map 226 are both suited for use in generating the queries 308.

Query generator 320 can combine the lidar feature map 224 and the radar feature map 226, e.g., using element-wise concatenation or other element-wise operations, before applying weights to compute the queries 308. As discussed above, feature maps may be resampled to make the feature maps conform to an expected size. For example, the lidar feature map 224 and the radar feature map 226 could each be resampled into a 128×128 matrix, where each entry in the 128×128 matrix corresponds to an embedding vector having a certain number of elements (e.g., a vector of length 10). In that case, concatenation may produce a 256×256 matrix. Depending on the sizes of the feature maps, concatenation may not be feasible given the added processing latency and implementation complexity of the transformer. Other element-wise operations can be used to combine feature maps for purposes of generating a matrix from which queries are obtained. For example, each element in the lidar feature map 224 can be summed with a corresponding element in the radar feature map 226 to produce a matrix having the same size as the individual feature maps (e.g., 128×128). Other element-wise operations can be used besides element-wise summation. For instance, a 128×128 matrix could be formed using element-wise maxpooling to choose the larger value among each pair of corresponding elements.

After combining the lidar feature map 224 and the radar feature map 226, the query generator 320 can apply weights to the combined lidar and radar features to generate the queries 308. The weights are typically in the form of a weight matrix, which is multiplied with a matrix corresponding to the combined lidar and radar features to produce a query matrix. The query matrix can be used in its entirety. For example, a total of 25 query vectors can be obtained from a 5×5 query matrix, where each query vector has a certain number of elements (e.g., a vector of length 10). However, the same performance considerations discussed above with respect to concatenation (e.g., latency) also apply here. In practice, it may not be possible to process the entire query matrix in real-time. As an alternative, the size of the queries 308 can be reduced by selecting a subset of features for generating the queries 308. For example, the heatmap approach shown in FIG. 7 (discussed below) can be used to extract a certain number of embedding vectors from the combined lidar and radar features for use with the weights that produce the query matrix. When the size of the queries is reduced, the size of keys and values can be reduced correspondingly to match the reduced-sized queries. For instance, in the example of FIG. 3, embedding vectors from corresponding positions in the image feature map 222 can be selected for use in generating the keys 304 and the values 306 instead of using the entire image feature map 222.

In the example of FIG. 3, data from the three sensor modalities is combined concurrently through the operations of the transformer 230. In particular, the decoder(s) 314 apply attention using the keys 304 and values 306 derived from the image feature map 222 together with the queries 308 derived from the lidar feature map 224 and the radar feature map 226. Applying attention to the keys 304, values 306, and queries 308 causes the fused features 132 to include contributions from all three feature maps. This is described in further detail below. In essence, keys and queries can be used to compute scores for weighting values. Consequently, the weighted values are a function of data from not only the source(s) of the keys and values (e.g., image feature map 222), but also the source(s) of the queries (e.g., lidar feature map 224 and radar feature map 226). As such, the fused features 132 provide a more comprehensive representation of the environment compared to the feature maps 222, 224, 226 taken individually.

Figure 4:
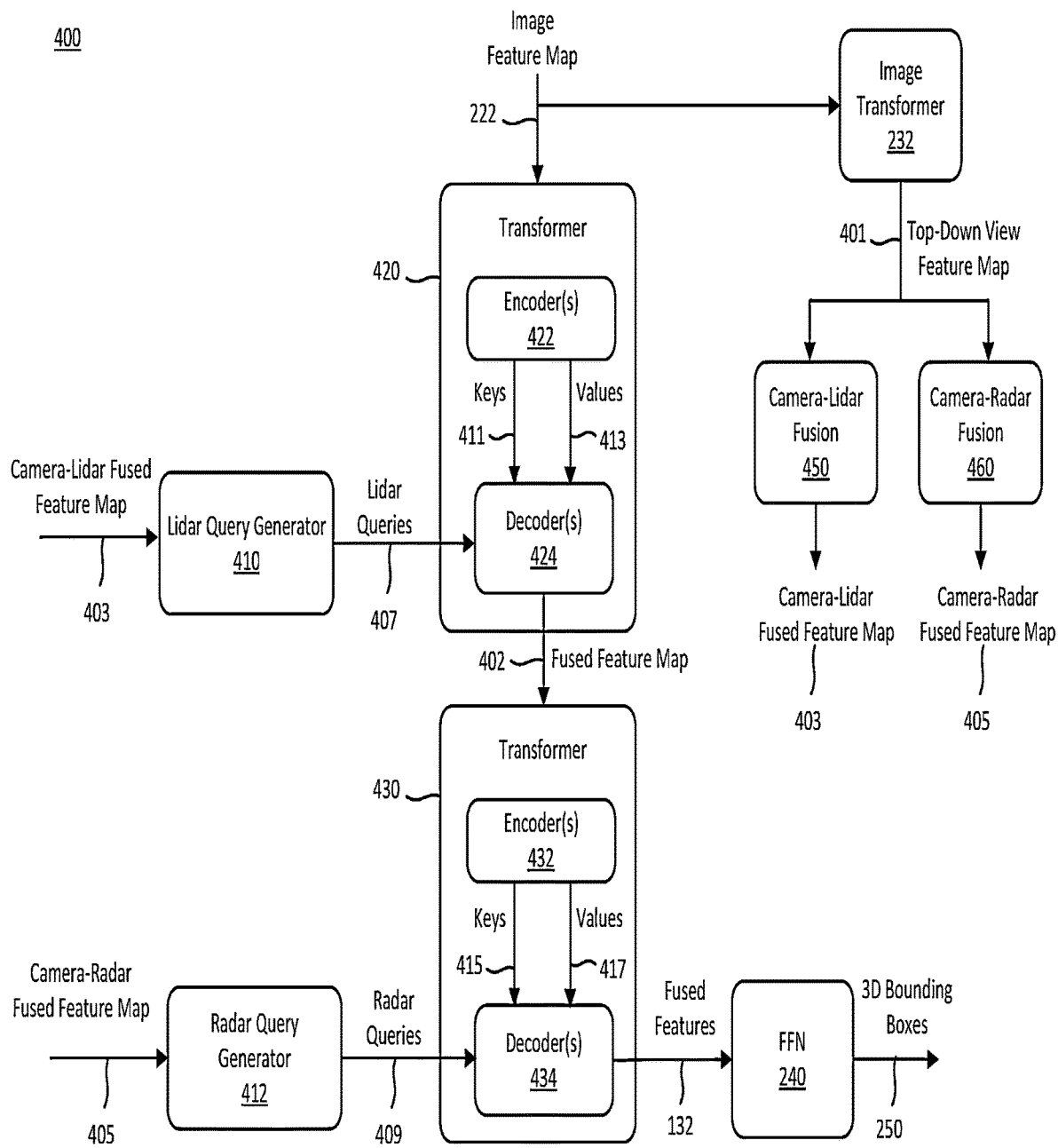
FIG. 4 shows an example implementation of the system depicted in FIG. 2.

FIG. 4 shows an example system 400 including machine learning components configured in accordance with the functionality described above in connection with FIG. 2. The system 400 corresponds to an implementation in which camera data, lidar data, and radar data are combined using cascaded transformation stages. The system 400 includes a lidar query generator 410, a radar query generator 412, a first transformer 420, and a second transformer 430. The transformers 420 and 430 collectively form the transformer 230 in FIG. 2. As shown in FIG. 4, the first transformer 420 operates on lidar queries 407 generated by the lidar query generator 410. Similarly, the second transformer 430 operates on radar queries 409 generated by the radar query generator 412. The first transformer 420 uses the lidar queries to generate a fused feature map 402 for input to the second transformer 430. In turn, the second transformer 430 uses the fused feature map 402 and the radar queries 409 to generate the fused features 132 for input to the FFN 240.

In the example of FIG. 4, the system 400 includes the image transformer 232. However, cascaded transformation can be performed without the image transformer 232. In FIG. 4, the image transformer 232 is configured to convert the image feature map 222 into a top-down view feature map 401, which is then combined with lidar and radar features to generate corresponding fused featured maps for input to the query generators 410 and 412. The top-down view feature map 401 is processed by a camera-lidar fusion module 450 and a camera-radar fusion module 460, which can be part of the image transformer 232. The camera-lidar fusion module 450 combines the top-down view feature map 401 with the lidar feature map 224 to produce a camera-lidar fused feature map 403 as input to the lidar query generator 410. Similarly, the camera-radar fusion module 460 combines the top-down view feature map 401 with the radar feature map 226 to produce a camera-radar fused feature map 405 as input to the radar query generator 412. Example techniques that can be applied by the fusion modules to produce the camera-lidar fused feature map 403 and the camera-radar fused feature map 405 are described below in connection with FIGS. 5 and 6.

The transformers 420 and 430 can be structured like the transformer in FIG. 3. For example, the first transformer 420 can include one or more encoders 422 that produce keys 411 and values 413 for input to one or more decoders 424. Similarly, the second transformer 430 can include one or more encoders 432 that produce keys 415 and values 417 for input to one or more decoders 434. In the case of the encoder(s) 422, the keys 411 and values 413 are generated using the image feature map 222.

The decoder(s) 424 of the first transformer 420 use the keys 411, the values 413, and the lidar queries 407 to generate the fused feature map 402. The fused feature map 402 therefore represents the result of applying attention to combine camera data and lidar data. The fused feature map 402 is distinct from the camera-lidar fused feature map 403 in that the camera-lidar fused feature map 403 only serves as input for generating the lidar queries 407.

The encoder(s) 432 of the second transformer 430 generate the keys 415 and the values 417 using the fused feature map 402. The decoder(s) 434 of the second transformer 430 apply attention, using the keys 415, the values 417, and the radar queries 409 to generate the fused features 132, e.g., a final feature map in the shape of a tensor suitable for processing by the FFN 240. In this manner, image features can be combined with lidar features using attention, with the resulting combination of image and lidar features being further combined with radar features, also using attention.

FIG. 4 is merely one example of a sequence of transformer-based attention operations through which features from different sensor modalities are successively combined to ultimately produce a single set of fused features. The order in which the features are combined can vary. For example, in some implementations, image features may be combined with radar features before being combined with lidar features. As another example, the system 400 can be modified so that the inputs to the second transformer 430 are swapped, with the fused feature map 402 being used to form the queries 409 and radar features being used to form the keys 415 and the values 417.

The system 400 has greater implementation complexity and uses more computing resources compared to the system 300 in FIG. 3, so training time and latency in use (e.g., total inference time including feature extraction) are factors which may be taken into consideration during system design. However, one advantage to generating the fused features 132 in accordance with the example of FIG. 4 is that the system 400 is more resilient to unavailability of data from one or more sensor modalities. During runtime, e.g., post-training operation on-board an autonomous vehicle, there may be times when a sensor is unable to provide meaningful data or, in some instances, no data at all. Such dropping of a sensor modality can be attributed to any number of causes including, for example, loss of power to the sensor, signal interference, physical obstructions, etc. In the system 300, dropping a sensor modality may result in temporary loss of the keys and values or temporary loss of the queries, in which case the transformer 230 may have to rely on data from an older feature map. In contrast, if the lidar sensor drops out in the system 400, the image features can still be combined with the radar features. For example, the decoder(s) 424 and the encoder(s) 432 can be bypassed to substitute the keys 411 and the values 413 for the keys 415 and the values 417, respectively. Similarly, if the camera drops, the lidar features can still be combined with the radar features (e.g., by substituting lidar feature map 224 for the fused feature map 402); and if the radar drops, the first transformer 420 can still combined the image features with the lidar features to provide the fused feature map 402 as input to the FFN 240. The accuracy of the objection detection may suffer as a result, but the boundaries of at least some objects can be determined in many cases despite the sensor drop.

Figure 5:
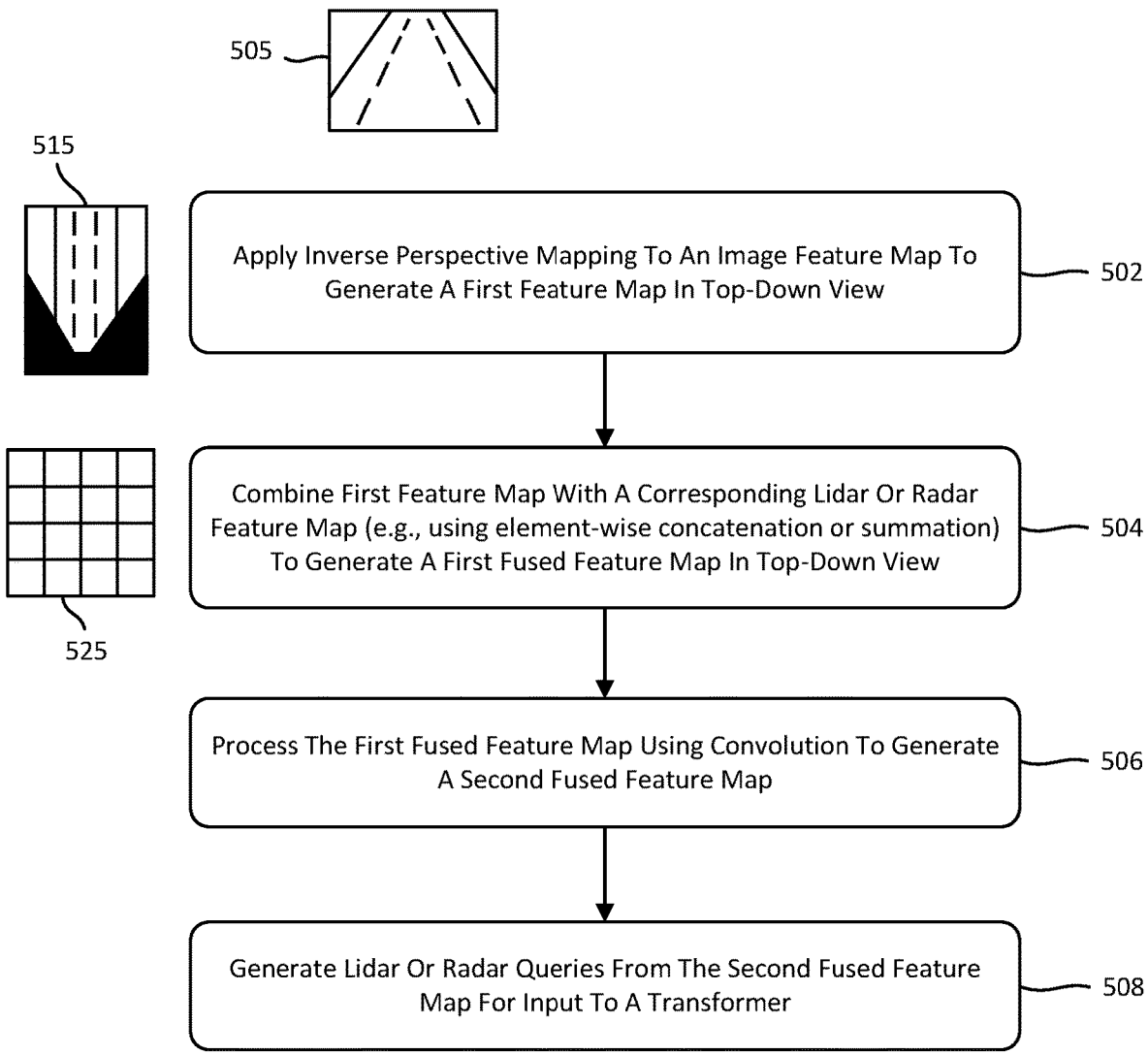
FIG. 5 is a flow diagram of an example process for converting image data into top-down view format.

FIG. 5 is a flow diagram illustrating an example process 500 for converting an image feature map to a top-down view feature map. The process 500 can be performed using the image transformer 232 and begins at 502 with applying inverse perspective mapping (IPM) to an image feature map to generate a first feature map in top-down view. The first feature map may, for example, correspond to the top-down view feature map 401 generated from the image feature map 222. IPM may involve using a transformation matrix to project the image feature map 222 onto a top-down plane. Each pixel represented in the image feature map 222 can be projected onto the top-down plane through homography. IPM assumes that the plane being projected onto is flat and that all objects are also flat, i.e., with zero height. The transformation matrix is based on a camera geometric model (e.g., a pinhole camera model) and can be determined through applying least squares estimation to a set of four or more points to be projected (e.g., four lane marker lines or other reference points). Once the transformation matrix is determined, it can be applied to the entire image feature map to determine the corresponding location in the top-down view feature map for each image pixel. As an example, the image feature map 222 may correspond to an encoded representation of a camera image 505 captured from the perspective of the camera 202. The image 505 may show a road in front of a vehicle on which the camera 202 is mounted. Applying IPM may therefore produce a top-down view feature map corresponding to an encoded representation of an image 515 in which the road is shown from the perspective of looking straight down (perpendicular to the top-down plane) from above the vehicle.

At 504, the first feature map is combined with a corresponding lidar or radar feature map to generate a first fused feature map in top-down view. The first fused feature map may correspond to a preliminary version of the camera-lidar fused feature map 403 or a preliminary version of the camera-radar fused feature map 405 and can be generated through element-wise concatenation or summation with the lidar/radar feature map. For example, to generate the camera-lidar fused feature map 403, the image transformer 232 can concatenate or sum together features from the top-down view feature map 401 with features at the corresponding location in the lidar feature map 224. Likewise, the image transformer 232 can concatenate or sum together features from the top-down view feature map 401 with features at the corresponding location in the radar feature map 226 to generate the camera-radar fused feature map 405. Element-wise concatenation or summation assumes that the feature maps being combined are the same size. However, the sizes of the feature maps may differ. For instance, inverse perspective mapping may produce a much smaller top-down image 515 compared to the original camera image 505. If needed, the resampling techniques described above can be applied to one or more of the feature maps being combined in 504 to make the feature maps the same size.

At 506, the first fused feature map is processed using convolution to generate a second fused feature map, e.g., a final version of the camera-lidar fused feature map 403 or a final version of the camera-radar fused feature map 405. The functionality in 506 can be implemented using one or more convolutional layers.

At 508, the second fused feature map is used to generate queries (e.g., the lidar queries 407 or the radar queries 409) for input to a transformer. The transformer can apply attention using the queries from the second fused feature map together with keys and values from another sensor modality, e.g., lidar, radar, or some other non-camera sensor.

FIG. 6 is a flow diagram illustrating an example process 600 for converting an image feature map 605 (e.g., an RGB feature map corresponding to image feature map 222) into a top-down view feature map. The process 600 provides an alternative method by which the image transformer 232 can convert the image feature map 222 into the camera-lidar fused feature map 403 or the camera-radar fused feature map 405. The process 600 involves the use of transformer-based attention rather than inverse perspective mapping. Like the attention applied by the transformer 230, the attention in process 600 involves different sensor modalities. As such, the image feature map 605 can be combined with a feature map from another sensor modality without first transforming the image feature map 605 into a standalone feature map in top-down perspective (e.g., top-down view feature map 401).

At 602, the image feature map 605 is collapsed along a vertical (height) direction to form condensed image features 615. As shown in FIG. 6, the image feature map 605 may correspond to a 2D grid having a particular height and width, where the height spans the rows of a camera image, and the width spans the columns of the camera image. Although not strictly required, collapsing the image feature map 605 significantly reduces the amount of computation involved in later steps. One method of collapsing the image feature map is to apply column-wise maxpooling. Thus, the largest feature value along any particular column can be selected as the representative value for that particular column. Collapsing of the image features in this manner is possible because for many applications, including autonomous driving, it can be assumed that there is at most one object present in any given column. There can, of course, be multiple objects in a single row.

At 604, the condensed image features 615 are converted into keys and values, e.g., through matrix multiplication with respective weight matrices.

At 606, the keys and values from 604 are used, together with queries derived from a lidar or radar feature map, to generate a fused feature map, e.g., the camera-lidar fused feature map 403 or the camera-radar fused feature map 405. The image transformer 232 may operate in a similar manner to the transformer 230. For example, both the image transformer 232 and the transformer 230 may execute multiple attention threads, known as multi-headed attention. Alternatively, attention can be performed using a single attention thread (single-headed attention). Multi-headed and single-headed attention are described below in reference to FIGS. 8 to 10.

At 608, the fused feature map from 606 is used to generate queries (e.g., the lidar queries 407 or the radar queries 409) for input to a transformer. The functionality in 608 is analogous to that of 508 in FIG. 5 and may be implemented using the lidar query generator 410 or the radar query generator 412.

Generating queries using transformer attention is more computationally expensive compared to inverse perspective mapping and requires training of the transformer, e.g., joint training using ground truth images. However, using attention to generate queries has the potential to be much more accurate since the features from the lidar or radar feature map have already been determined by a feature extractor (e.g., CNN 214 or CNN 216) as likely corresponding to objects of interest. Thus, the image transformer 232 can project the condensed image features onto relevant locations in a top-down view plane (e.g., the plane of the lidar or radar feature map). The attention applied by the image transformer 232 correlates the condensed image features to the lidar or radar features, thereby capturing relationships between the columns of the image feature map and top-down view locations.

Figure 7:
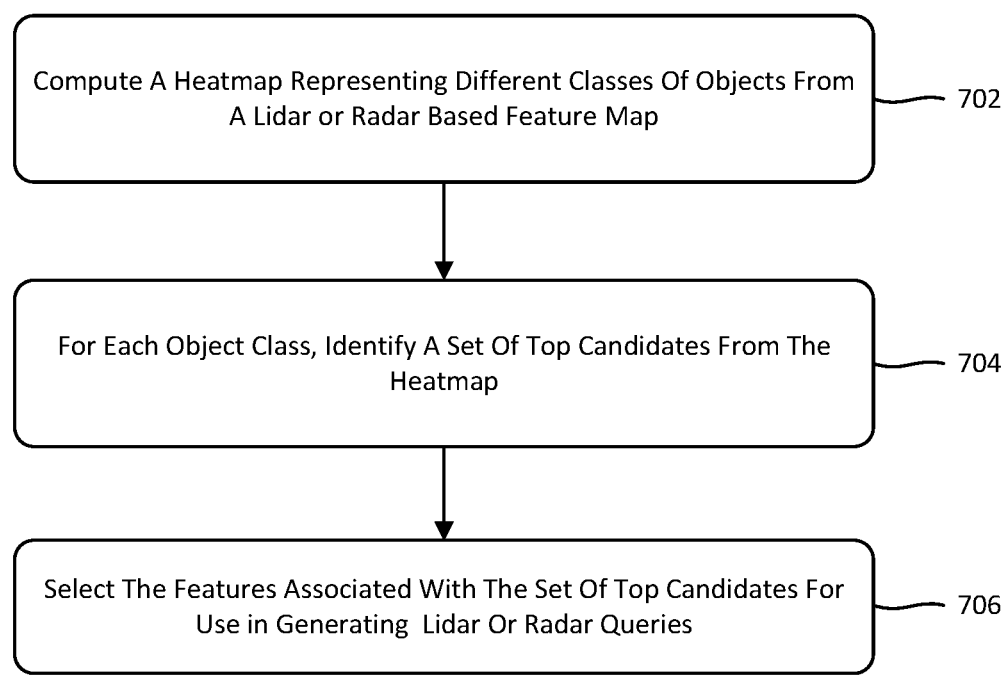
FIG. 7 is a flow diagram of an example process for generating queries as input to a transformer-based machine learning model.

FIG. 7 is a flow diagram illustrating an example process 700 for generating queries as input to the transformer 230. The process 700 can be performed using a query generator in a cascaded transformer implementation, e.g., the lidar query generator 410 or the radar query generator 412. However, the techniques shown in FIG. 7 can also be used to generate queries in non-cascaded implementations such as the example in FIG. 3. At 702, the query generator can compute a heatmap from a lidar or radar based feature map. The heatmap can be computed using a standalone lidar/radar feature map, e.g., lidar feature map 224 or radar feature map 226. Alternatively, the heatmap can be computed using a fused feature map. For example, in FIG. 4, a heatmap can be computed using the camera-lidar fused feature map 403 or the camera-radar fused feature map 405. Similarly, in FIG. 3, a heatmap can be computed using a feature map corresponding to a result of combining lidar feature map 224 and radar feature map 226 based on element-wise operations (e.g., concatenation, summation, or maxpooling). As discussed above, lidar and radar feature maps, as well as fused feature maps derived therefrom, can be expressed in top-down view as a 2D grid. Thus, the feature map in 702 can be an n-dimensional feature map of real values organized into an H×W×n matrix, where H is the height of the 2D grid and W is the width of the 2D grid, i.e., H×W denotes the size of the top-down view feature map, and n is the length of each vector.

The heatmap represents different classes of objects and can therefore be expressed as a real-valued matrix S of size H×W×C, where C is the total number of classes or object categories. Each entry in the heatmap represents a score indicating the likelihood that an object of a particular class is present at the corresponding location in H×W space, i.e., the top-down view plane of the lidar or radar based feature map. The heatmap can be computed based on the values of the lidar or radar based feature map, using machine learning or a deterministic algorithm.

At 704, for each object class, the query generator can identify a set of top candidates, and therefore the corresponding locations of these candidates, from the heatmap. The total number K of top candidates can vary depending on class and may be a configurable hyperparameter. Thus, the query generator may identify the top $K_i$ candidates from the H×W sized heatmap $S_i$ of the i-th class. Additionally, the query generator may constrain the total number of candidates identified across all classes based on a threshold N, where N is the desired number of queries so that a total of N candidates are identified. Another constraint that can be applied in identifying the top candidates is to require that every candidate identified must correspond to the local maximum for a neighborhood within $S_i$. In this way, only one candidate (the one with the highest heat score) may be identified per neighborhood. The neighborhood can be sized to ensure a certain amount of spatial separation between every identified candidate within a particular class.

At 706, the features associated with the candidates identified in 704 are selected from the lidar/radar based feature map in 702 for use in generating lidar or radar queries. In this manner, a subset of embedding vectors (N in total) can be extracted from the lidar/radar based feature map to compute the queries.

Figure 8:
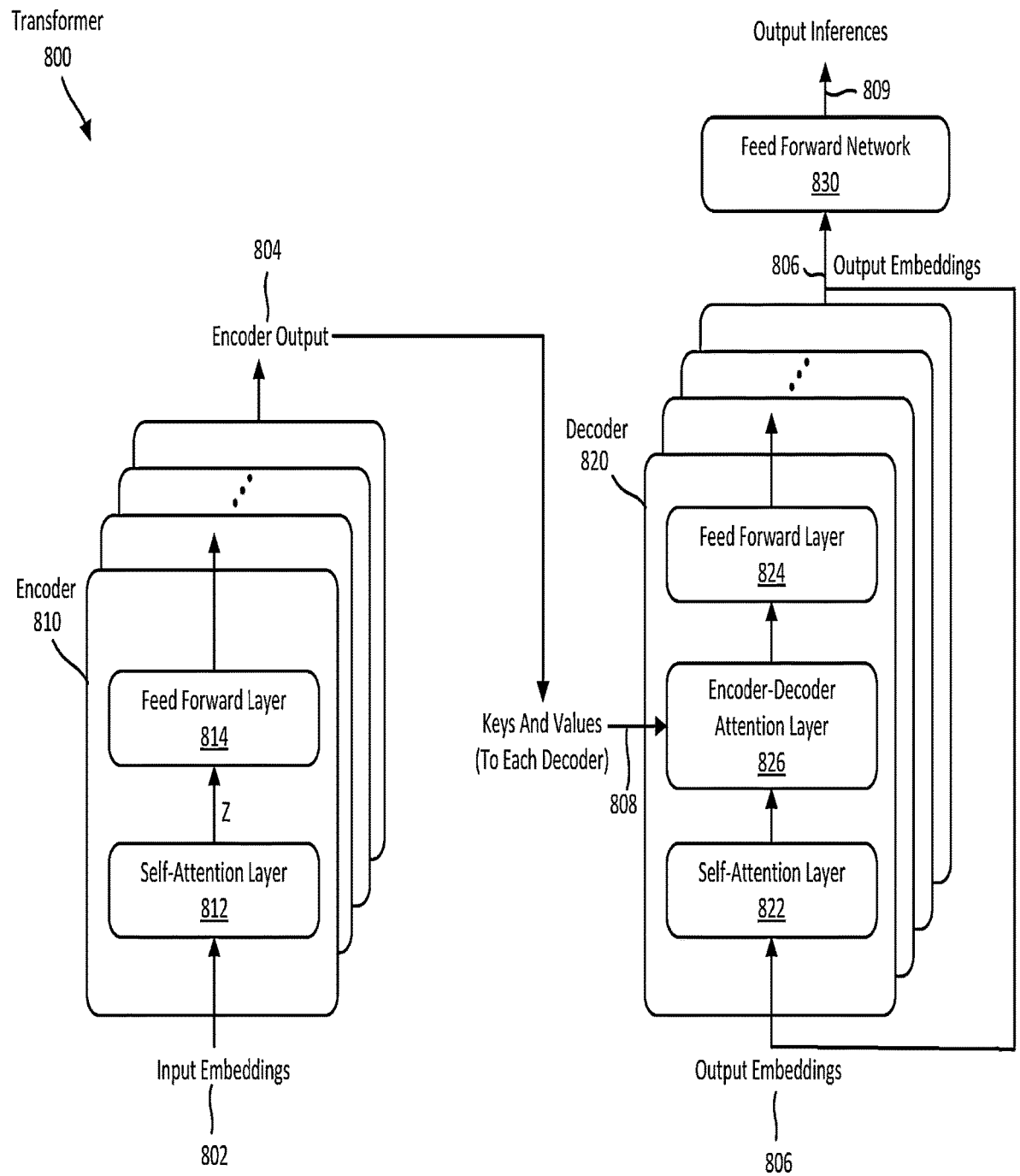
FIG. 8 shows an example of a transformer-based machine learning model.

FIG. 8 shows an example of a transformer 800 including an encoder 810 and a decoder 820. The example of FIG. 8 is described with reference to self-attention. However, the transformer 800 can be used to perform self-attention or cross-attention depending on the source(s) of queries, keys, and values. The transformer 800 can be configured to perform self-attention when the queries, keys, and values all originate from a single input source, e.g., one sensor modality. The transformer 800 can be configured to perform cross-attention when the queries, keys, and values are from different input sources, e.g., two or more sensor modalities. In the example shown, the encoder 810 is the first encoder in a stack of similarly configured encoders. Each encoder produces input to the next encoder in the encoder stack, with an output 804 of the encoder stack being formed at the last encoder. Likewise, the decoder 820 is the first decoder in a stack of similarly configured decoders. Each decoder produces input to the next decoder in the decoder stack, with output embeddings 806 being formed at the last decoder. The output embeddings 806 are also fed back to the decoder stack in sequence. This feedback is useful for capturing relationships between different input sequences, for example, between embeddings representing individual words of a sentence in natural language processing applications. However, such feedback can be omitted when using attention to combine data from different sensor modalities in connection with object detection.

Figure 11:
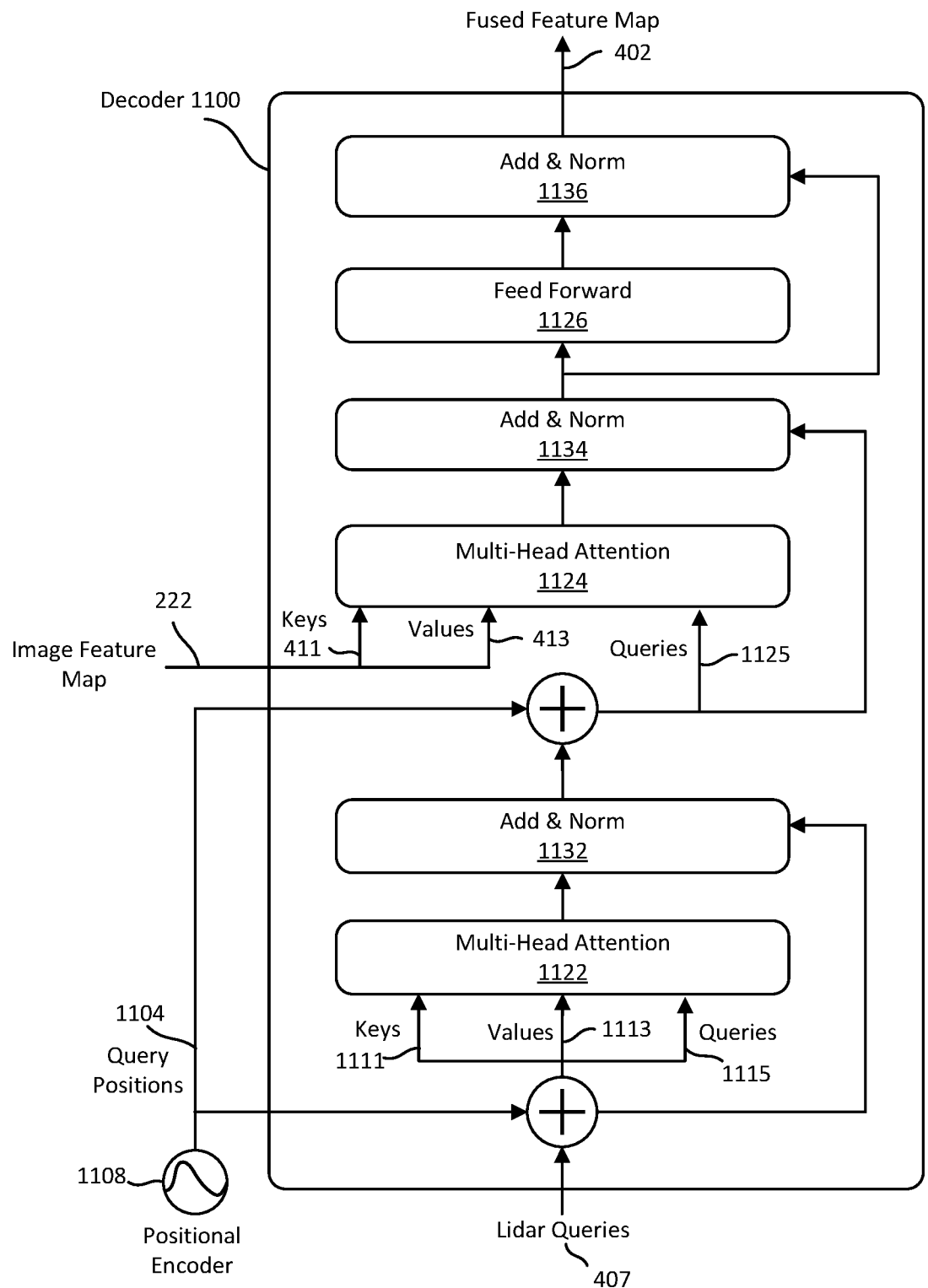
FIG. 11 shows an example of a decoder that can be used to implement a transformer-based machine learning model.
Figure 12:
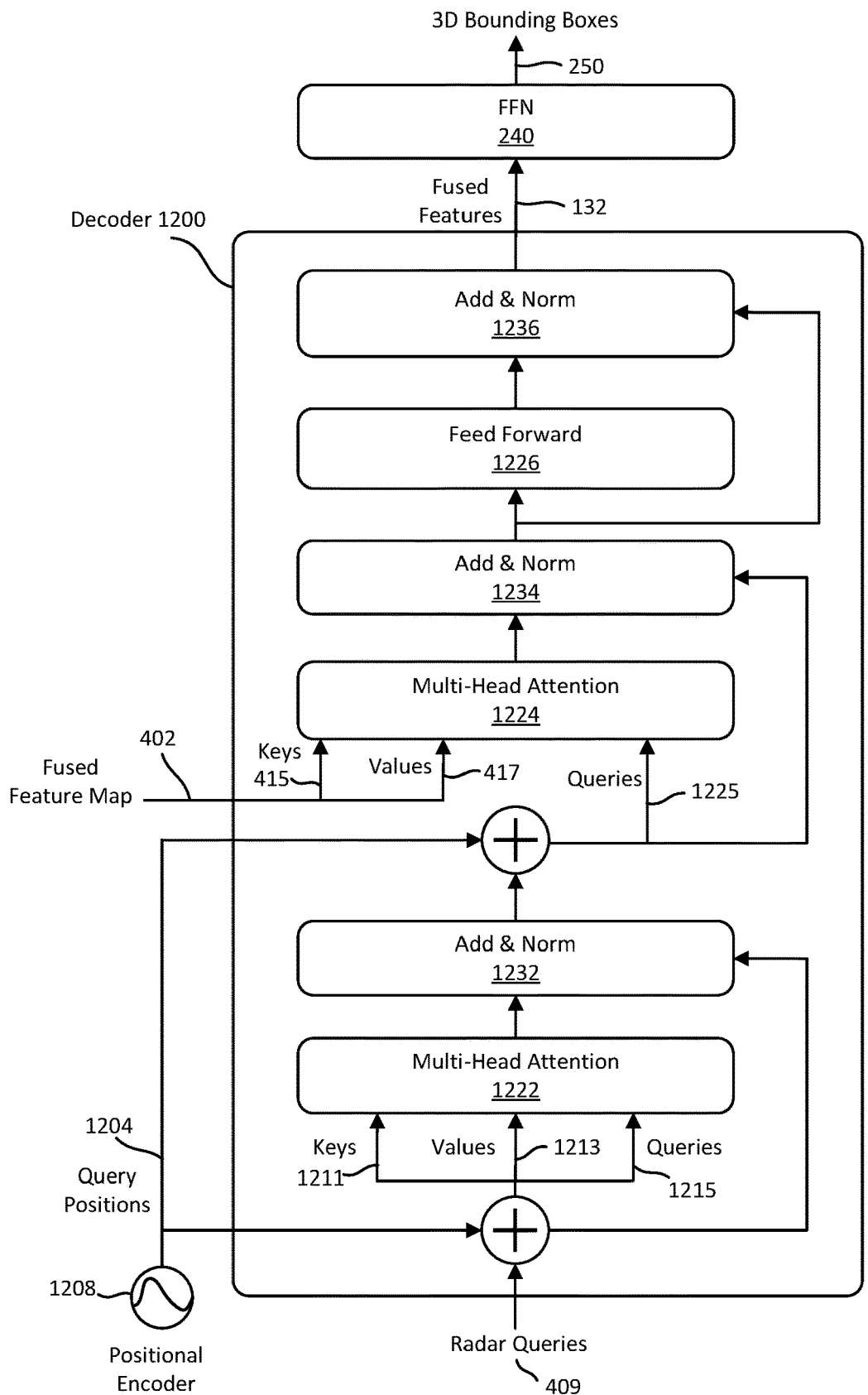
FIG. 12 shows an example of a decoder that can be used to implement a transformer-based machine learning model.

Encoder 810 receives input embeddings 802, which can be vectors corresponding to features obtained from a feature map. The encoder 810 includes a self-attention layer 812 coupled to a feed forward layer 814. Similarly, the decoder 820 includes a self-attention layer 822 coupled to a feed forward layer 824. The decoder 820 further includes an encoder-decoder attention layer 826 between the self-attention layer 822 and the feed forward layer 824. FIG. 8 is a simplified illustration of the various layers in a transformer. The encoder 810 and the decoder 820 can include additional layers and/or sub-layers not shown. For example, the encoder and the decoder may each include a pair of summation and normalization (add & norm) layers, one before the feed forward layer and another after the feed forward layer. Examples of decoders with add & norm layers are shown in FIGS. 11 and 12, discussed below.

The input embeddings 802 can be processed in sequence as individual embedding vectors. More typically, the embedding vectors are grouped into a matrix for combined processing. Self-attention enables vectors that are processed earlier in time to influence the processing of later vectors, similar to the role of a hidden state in a recurrent neural network. Each encoder of the transformer 800 is provided with three sets of trained weight matrices, which are applied to the input embeddings 802 to produce queries, keys, and values. The weight matrices are usually encoder-specific and not shared between encoders. For example, the encoder 810 may have a first weight matrix $W_Q$ for generating queries, a second weight matrix $W_K$ for generating keys, and a third matrix $W_V$ for generating values. In general, the vectors forming each of these weight matrices have reduced dimensionality compared to the input embeddings 802.

Self-attention layer 812 is configured to convert the input embeddings 802 into queries, keys, and values through multiplication with the weights in the weight matrices $W_Q$, $W_K$, $W_V$, e.g., to produce a query matrix Q, a key matrix K, and a value matrix V, respectively. After computing the queries, keys, and values, the self-attention layer 812 may perform dot-product multiplication between the queries and the keys. The values resulting from the dot-product multiplication represent scores that determine the extent to which the embeddings at a particular position within the input sequence contribute to the output of the self-attention layer 812. In the context of the sensor-derived feature maps described above, the positions may correspond to spatial locations.

After multiplying the queries with the keys, the self-attention layer 812 may optionally scale the scores and normalize the scaled scores, e.g., using a Softmax function so that the scores for each embedding vector add up to 1. The self-attention layer 812 then multiplies the scores with the values to compute a separate weighted sum of values for each position. The output of the self-attention layer 812 is a matrix Z of embeddings that is passed to the feed forward layer 814. Setting aside the scaling and normalization, the computation of the matrix Z can be expressed mathematically as $Q \times K^T \times V$, where $K^T$ is the transpose of the key matrix K.

The encoder-decoder attention layer 826 of each decoder in the decoder stack receives keys and values 808 as input. The keys and values 808 are derived from the output 804 of the last encoder and can be computed in a similar manner as the matrices K and V described above, through applying a key matrix and a value matrix to the output 804. The same keys and values 808 are provided to every encoder-decoder attention layer.

The self-attention layer 822 of the decoder 820 operates similarly to the self-attention layer 812 of the encoder 810, except that the self-attention layer 822 may be restricted to attending to earlier positions in the output embeddings 806 by masking off later positions. The self-attention layer 822 receives the output embeddings 806 from the last encoder and can compute queries, keys, and values from the output embeddings 806, using a set of weight matrices that are specific to the decoder 820. The above discussion of self-attention is intended to illustrate the general operation of a transformer. As apparent from subsequent examples (e.g., FIGS. 11 and 12), the transformer architecture can be modified for purposes of combining sensor data in the context of object detection. For example, in addition to omitting the feedback in the decoder stack, the self-attention layers 812 and 822 can optionally be omitted so that attention is only applied across data from different sensor modalities and not within a single sensor modality.

Cross-attention processing is similar to self-attention processing, except that the keys, queries, and values are generated from multiple input sources. For example, instead of generating the keys and values 808 from the input embeddings 802, the keys and values 808 could be generated using a separate set of input embeddings. Thus, the processing performed by the encoder-decoder attention layer 826 could be expressed mathematically as $(W_Q \times S_2)(W_K \times S_1)(W_V \times S_1)$, where $S_1$ is an input sequence corresponding to features of a first sensor modality (e.g., the input embeddings 802), $S_2$ is an input sequence corresponding to features of a second sensor modality, and $W_Q$, $W_K$, and $W_V$ are decoder-specific weight matrices analogous to the weight matrices described above with respect to the self-attention layer 812 of the encoder 810.

To generate inferences from the output embeddings 806, the last decoder can be coupled to the input of an FFN 830. In FIG. 8, the FFN 830 is depicted as being part of the transformer 800, but the FFN 830 can be implemented as a separate neural network, similar to the FFN 240 in FIG. 2. The FFN 830 may include a fully-connected layer configured to apply a linear transformation to the output embeddings 806 to generate the input to a Softmax layer, with the Softmax layer being the last layer of the FFN 830. Other FFN architectures can also be used to generate predictions.

The FFN 830 ultimately generates a set of output interferences 809, which can include values indicating the boundaries of objects in 3D space.

FIG. 9 illustrates an example of single-headed attention, which was described above in connection with the transformer of FIG. 8. In single-headed attention, the input embeddings to an attention layer of the transformer (e.g., self-attention layer 812 or self-attention layer 822) are processed to form a single attention head, e.g., an attention head 915. The attention head 915 is a matrix of embeddings and may, for example, correspond to the matrix Z described above. As shown in FIG. 9, an input matrix 901 (e.g., a matrix corresponding to the input embeddings 802) is separately multiplied with a first weight matrix 902, a second weight matrix 904, and a third weight matrix 906 to produce a query matrix 912, a key matrix 914, and a value matrix 916, respectively. The query matrix 912, key matrix 914, and value matrix 916 are then processed through an attention layer 920, e.g., using the matrix operation $Q \times K^T \times V$ as discussed above.

Figure 10:
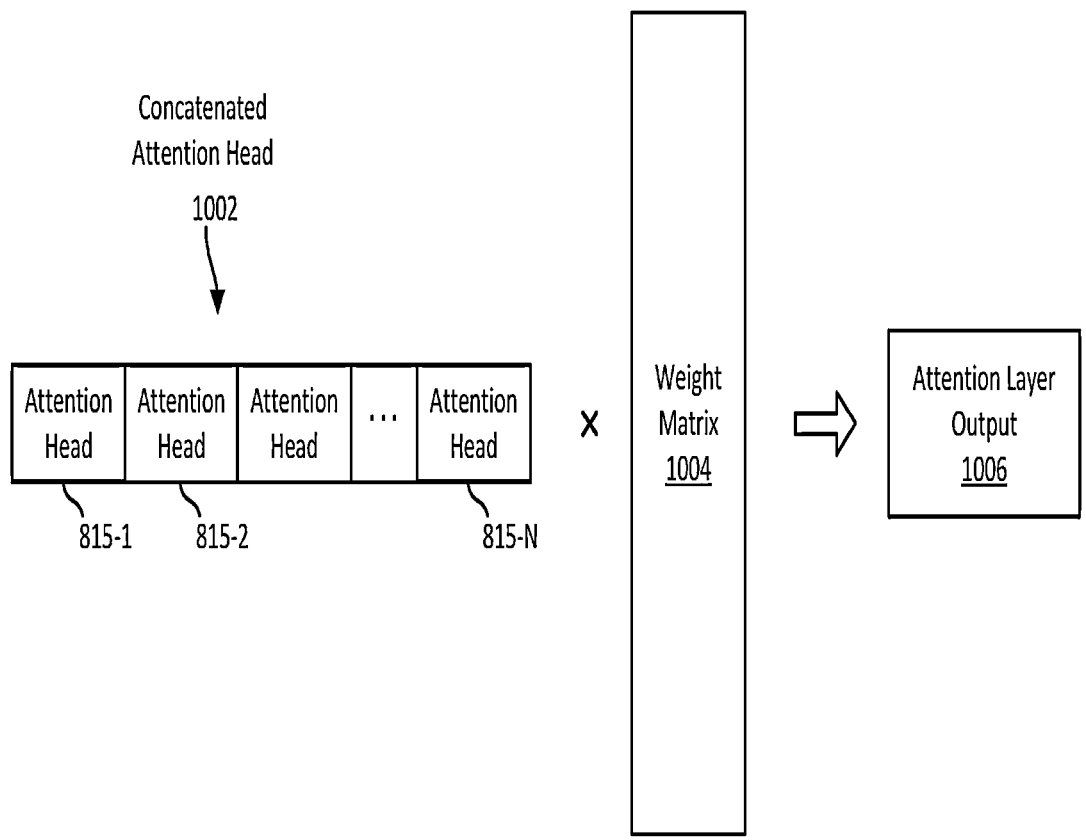
FIG. 10 shows an example of multi-headed attention.

FIG. 10 illustrates an example of multi-headed attention, which can be incorporated into the processing performed during self-attention or cross-attention as an alternative to the single-headed approach illustrated in FIG. 9. As such, the cross-attention layer(s) of a transformer may use multi-headed attention in some implementations. Multi-headed attention involves parallel processing on different portions of the embeddings that are input to an encoder or decoder. Each portion encompasses a different set of positions (e.g., spatial locations) so that the embeddings are projected into multiple representation subspaces. Multi-headed attention is one way in which a transformer can jointly attend to different positions. Multi-layer single-headed attention is another technique for jointly attending to different positions. However, multi-headed attention has the added benefit of faster computation due to the parallel processing.

To perform multi-headed attention, the transformer is provided with multiple sets of weight matrices. Each set of weight matrices includes a matrix of query weights, a matrix of key weights, and a matrix of value weights, which are analogous to the weight matrices 902, 904, and 906. The number of sets is equal to the desired number of attention heads and can be a configurable hyperparameter. Each set of weight matrices can be randomly initialized and then trained. Thus, instead of generating a single attention head 815, the attention layer 920 can generate a separate attention head for each set of weight matrices, e.g., attention heads 815-1, 815-2, to 815-N, where N is the total number of attention heads. The attention heads are then combined into a concatenated attention head 1002. The concatenated attention head 1002 can be multiplied with a weight matrix 1004 to form an output 1006 of the attention layer (e.g., the input to feed forward layer 814 or feed forward layer 824). The weight matrix 1004 may be used to resize the concatenated attention head 1002 for subsequent processing. The weights of the weight matrix 1004 can be obtained through joint training so that the weights of the weight matrix 1004 are determined concurrently with the weights used to form the individual attention heads.

FIG. 11 shows an example of a decoder 1100 that can be used to implement the decoder 424 of the first transformer 420 in FIG. 4. The decoder 1100 may correspond to one decoder instance in a stack of similarly configured decoders. Thus, the decoder 424 can be formed using multiple decoders 1100. The decoder 1100 includes a first multi-headed attention layer 1122, a second multi-headed attention layer 1124, and a feed forward layer 1126.

The decoder 1100 further includes a positional encoder 1108. The positional encoder 1108 modifies the lidar queries 407 based on query positions 1104. For each embedding vector in the lidar queries 407, the positional encoder 1108 may sum the embedding vector with a corresponding positional encoding vector so that the resulting vector includes a representation of where the embedding vector is positioned within the lidar queries 407. After the lidar queries are modified to include positional encodings, the lidar queries 407 are processed (e.g., using weight matrices) to form keys 1111, values 1113, and queries 1115 as inputs to the first multi-headed attention layer 1122.

The first multi-headed attention layer 1122 is a self-attention layer since the keys 1111, values 1113, and queries 1115 are all derived from the lidar queries 407. The first multi-headed attention layer 1122 can compute the input to the next layer (an add & norm layer 1132) in accordance with the processing depicted in FIG. 10.

Add & norm layer 1132 has a residual connection to the embeddings that were used to form the input to the first multi-headed attention layer 1122. In particular, the add & norm layer 1132 receives the positionally encoded lidar queries 407, sums the positionally encoded lidar queries with the output of the first multi-headed attention layer 1122, and then normalizes the sum. The normalized sum is then used to generate queries 1125 for processing by the second multi-headed attention layer 1124. The queries 1125 can be generated in a similar manner as the queries 1115, by applying a weight matrix to the normalized sum. Further, as shown in FIG. 10, the positional encoder 1108 can positionally encode the queries 1125 using the same query positions 1104 that were applied to the lidar queries 407. Although positional encoding is described in connection with combined processing of keys, values, and queries, it should be noted that positional encoding can be performed earlier and/or at different times. For example, the lidar queries 407 may be positionally encoded when they are generated, e.g., in conjunction with computing a heatmap.

The second multi-headed attention layer 1124 is a cross-attention layer that computes its output based on image features and lidar features. In this example, the keys 411 and values 413 generated from the image feature map 222 are combined with the queries 1125 generated from the lidar queries 407. The second multi-headed attention layer 1124 may combine the keys 411, the values 413, and the queries 1125 using dot-product multiplication to compute the input to the next layer (an add & norm layer 1134) in a similar manner to the processing performed by the first multi-headed attention layer 1122, e.g., in accordance with the processing depicted in FIG. 10.

Add & norm layer 1134 sums the positionally encoded queries 1125 with the output of the second multi-headed attention layer 1124 and then normalizes the sum. The operation of the add & norm layer 1134 is similar to that of the add & norm layer 1132. Both of these layers are configured to perform inter-layer normalization based on residual connections to the input of the preceding layer.

Feed forward layer 1126 can be implemented as a fully-connected layer and is configured to linearly transform the output of the add & norm layer 1134. The linear transformation is applied independently to each position and may involve one or more linear functions, e.g., multiplication with a weight followed by summation with a bias/offset value.

The output of the feed forward layer 1126 is processed by an add & norm layer 1136, which operates similarly to the add & norm layers 1132 and 1134. In this instance, the add & norm layer 1136 has a residual connection to the input of the feed forward layer 1126. As shown in FIG. 10, the output of the decoder 1100 is formed at the add & norm layer 1136 and may correspond to the fused feature map 402, which represents the result of combining image features with lidar features.

FIG. 12 shows an example of a decoder 1200 that can be used to implement the decoder 434 of the second transformer 430 in FIG. 4. The decoder 1200 may correspond to one decoder instance in a stack of similarly configured decoders. Thus, the decoder 434 can be formed using multiple decoders 1200. The structure of the decoder 1200 is similar to that of the decoder 1100. For example, the decoder 1200 includes a first multi-headed attention layer 1222, a second multi-headed attention layer 1224, and a feed forward layer 1226, which are analogous to the first multi-headed attention layer 1122, the second multi-headed attention layer 1124, and the feed forward layer 1126, respectively. The decoder 1200 further includes an add & norm layer 1232, an add & norm layer 1234, and an add & norm layer 1236, which are analogous to the add & norm layer 1132, the add & norm layer 1134, and the add & norm layer 1136, respectively. Each of the above-listed components operates similarly to its counterpart component in the decoder 1100.

Decoder 1200 is configured to combine camera-lidar fused features with radar features to generate an output feature map representing the fusion of all three sensor modalities, e.g., the fused features 132. As shown in FIG. 12, the first multi-headed attention layer 1222 of the decoder 1200 operates on keys 1211, values 1213, and queries 1215, each of which is generated using the radar queries 409. Similar to the positional encoding applied to the lidar queries 407 in FIG. 11, the radar queries 409 are positionally encoded by a positional encoder 1208 based on query positions 1204. In this example, the query positions 1204 correspond to the positions of embedding vectors in the radar queries 409. In some embodiments, weights are shared across transformers, across attention heads within the same transformer, and/or across sensor modalities. For example, the radar queries 409 can be generated using the same weights as those used to generate the lidar queries 407. Similarly, transformers can share the same set of weights for generating keys and/or share the same set of weights for generating values.

The second multi-headed attention layer 1224 of the decoder 1200 performs cross-attention using the keys 415 and the values 417, both of which can be generated using the fused feature map 402 produced by the decoder 1100. The second multi-headed attention layer 1224 also operates on queries 1225, which can be generated through applying a corresponding weight matrix to the output of the add & norm layer 1232 after positional encoding based on the query positions 1204. In this manner, the camera-lidar fused features in the fused feature map 402 can be further combined with the radar features represented by the radar queries 409. The output of the decoder 1200 (or the last decoder in a stack of decoders 1200) may correspond to the fused features 132, which are fed into the FFN 240 to determine the 3D bounding boxes 250.

Figure 13:
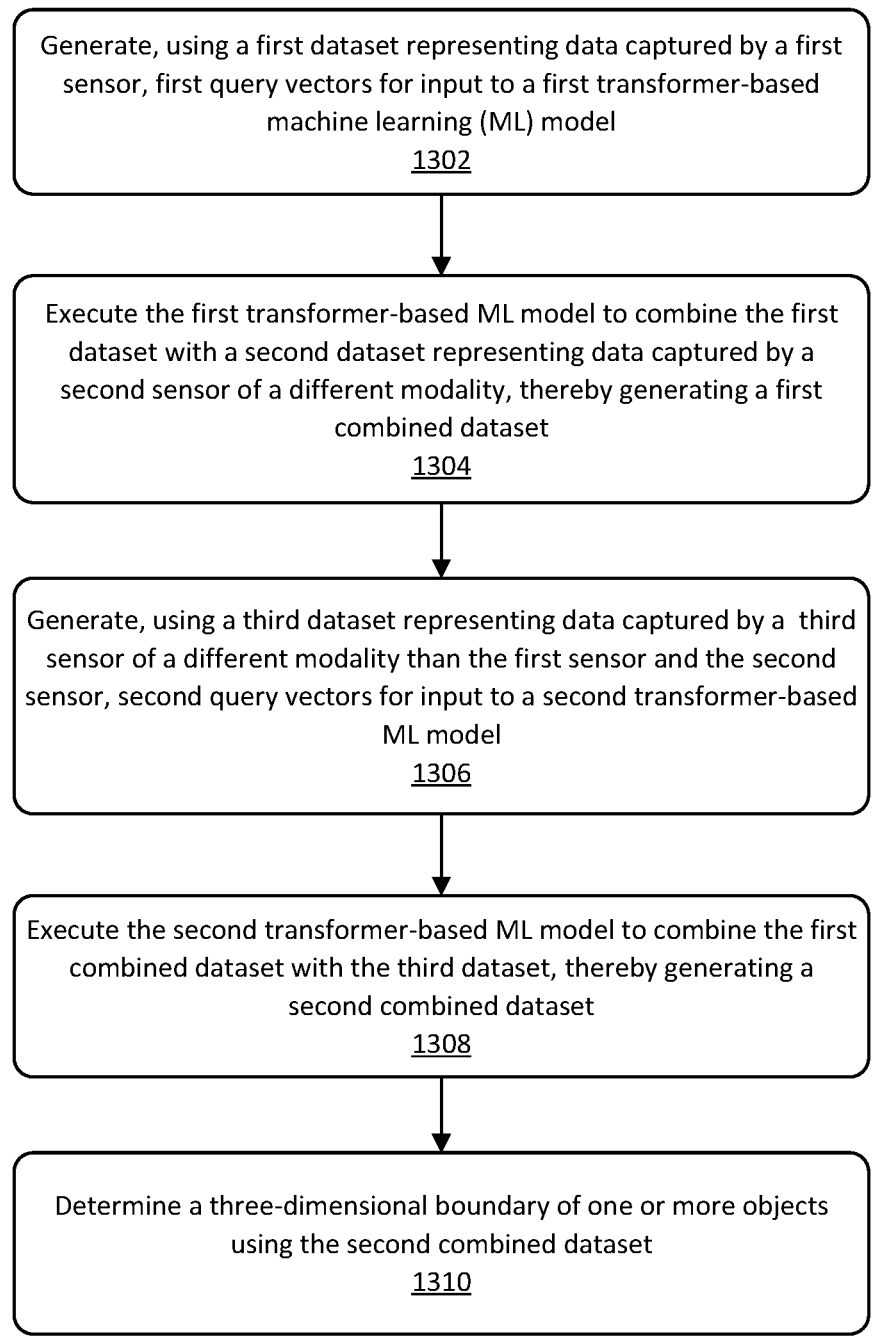
FIG. 13 is a flow diagram of an example process for detecting objects using data from different sensor modalities.

FIG. 13 is a flow diagram of an example process 1300 for detecting objects using data from different sensor modalities. The process 1300 can be performed using cascaded transformers configured to apply attention across sensor modalities, for example, using the system and machine learning (ML) components depicted in FIG. 4. The process 1300 may be performed after the machine learning components have undergone some initial training, e.g., based on labeled ground truth data and backpropagation to update weights and/or other parameters of the various ML components. As discussed above, multiple ML components may be jointly trained, e.g., end-to-end training of the entire system including training of feature extractors. Alternatively, ML components may be trained independently or over different training periods, e.g., such that training of ML components residing at later stages of processing may be trained with the aid of data generated by pre-trained ML components in earlier stages.

At 1302, a first dataset representing data captured by a first sensor is used to generate first query vectors for input to a first transformer-based ML model. For example, lidar feature map 224 can be used to generate lidar queries 407 for input to the first transformer 420. The first dataset can include encoded representations of the sensor data, e.g., a feature map formed of embedding vectors. The functionality in 1302 can be implemented using a query generator, e.g., lidar query generator 410. The query generator can generate the first query vectors in various ways including for example, using the heatmap approach shown in FIG. 7.

At 1304, the first transformer-based ML model is executed to combine the first dataset with a second dataset representing data captured by a second sensor of a different modality than the first sensor. For example, if the first dataset corresponds to lidar feature map 224, the second dataset may correspond to image feature map 222. The first transformer-based ML model is configured to compute first scores based on the first query vectors and to generate a first combined dataset through applying the first scores to values derived from the second dataset. For example, the transformer 420 can apply dot-product attention to form a score matrix by multiplying the keys 411 with the lidar queries 407, and then multiply the score matrix with a value matrix corresponding to the values 413. In this way, image features may be combined with lidar features.

At 1306, second query vectors are generated for input to a second transformer-based ML model, using a third dataset representing data captured by a third sensor of a different modality than the first sensor and the second sensor. For example, the third dataset may correspond to the radar feature map 226, which can be used to generate the radar queries 409 for input to the second transformer 430.

At 1308, the second transformer-based ML model is executed to combine the first combined dataset with the third dataset. Like the first transformer-based ML model, the second transformer-based ML model can apply attention across sensor modalities. In particular, the second transformer-based ML model is configured to compute second scores based on the second query vectors and to generate a second combined dataset through applying the second scores to values derived from the first combined dataset. For example, the transformer 430 can apply dot-product attention to form a score matrix by multiplying the keys 415 with the radar queries 409, and then form the fused features 132 by multiplying the score matrix with a value matrix corresponding to the values 417. In this way, camera, lidar, and radar features may be combined together to form input for object detection.

At 1310, the second combined dataset (e.g., fused features 132) is used to determine a three-dimensional boundary of one or more objects. The second combined dataset may be subjected to further combining with one or more additional datasets (e.g., a dataset representing data captured by a fourth sensor) prior to determining 3D boundaries. The functionality in 1308 can be performed using a neural network, e.g., FFN 240.

Successively combining sensor data using cascaded transformation stages is advantageous because the resulting combined data is resilient to sensor drop. Thus, the process 1300 may further involve detecting that data from a particular sensor is unavailable and adjusting the manner in which the first transformer-based ML model and the second transformer-based ML model are used. For example, the system can periodically determine whether there is an interruption in the data stream from a particular sensor and respond accordingly, e.g., through bypassing a transformation stage that relies on data which is currently unavailable, as discussed above in connection with FIG. 4.

Figure 14:
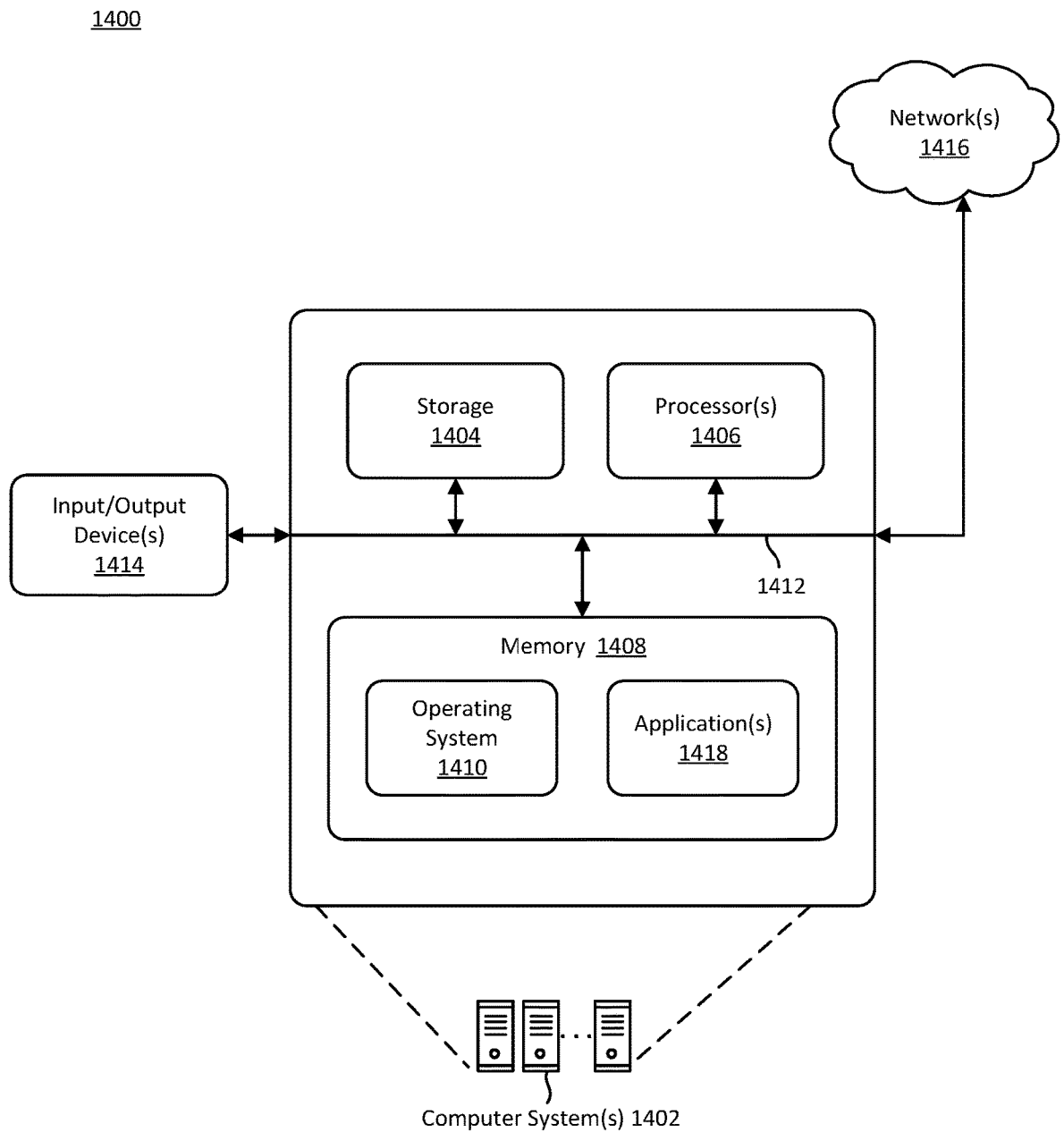
FIG. 14 illustrates an example computing environment in which one or more aspects of the disclosure can be implemented.

FIG. 14 illustrates an example computing environment 1400 in which the disclosures may be implemented in whole or in part. The computing environment 1400 includes one or more computer systems 1402. Each computer system 1402 may include storage 1404, one or more processors 1406, memory 1408, and an operating system 1410. The storage 1404, the processor(s) 1406, the memory 1408, and the operating system 1410 may be communicatively coupled over a communication infrastructure 1412, e.g., one or more buses. Optionally, a computer system 1402 may interact with a user via input/output (I/O) devices 1414, as well as one or more other computing devices over a network(s) 1416, via the communication infrastructure 1412. The operating system 1410 may interact with other components to control one or more applications 1418.

In some instances, a computer system 1402 may correspond to a computer system on which one or more machine learning components, e.g., a transformer-based ML model, a CNN, an FFN, or some other neural network, are trained. In other instances, a computer system 1402 may correspond to a computer system that provides a runtime execution environment for one or more machine learning components. For example, a computer system 1402 can be a controller of a vehicle on which a transformer-based ML model is deployed after being trained.

Memory 1408 may be implemented using one or more memory devices and can include volatile and/or non-volatile memory. The memory 1408 may, for example, include random access memory (RAM), read only memory (ROM), Electrically Erasable Programmable Read-Only Memory (EEPROM), flash memory, a hard disk drive, removable storage such as a compact disc (CD-ROM), and/or some other suitable storage media. The memory 1408 may store program code including instructions that, when executed by the processor(s) 1406, causes the processor(s) to perform one or more methods disclosed herein. In some implementations, the memory 1408 may include a non-transitory computer-readable medium storing such program code.

Memory 1408 can also store data generated or operated on by a computer system 1402. Such data may include, for example, output inferences of a neural network or other machine learning model, learned parameters (e.g., weights or biases), activation values passed between layers of a neural network, hidden states, or intermediate outputs. Storage 1404 may also store such data. In some instances, storage 1404 may operate as a secondary memory in which a data store (e.g., a non-relational or relational database) resides. The storage 1404, the processor(s) 1406, and the memory 1408 can be supplemented by, or incorporated in, application-specific integrated circuits (ASICs). In some implementations, the functionality provided by a computer system 1402 may be implemented as a system-on-chip (SOC).

I/O device(s) 1414 may include an input device such as a microphone, a touchscreen, a gesture recognition device, a mouse, a keyboard, or some other user-interfacing device. I/O device(s) 1414 may also include an output device such as a display, an audio speaker, a haptic feedback device, and/or the like. In some instances, an I/O device 1414 may operate as a communications interface that supports wireline or wireless communication. For example, I/O device(s) 1414 may include a network interface card, a modem, a router, a wireless transceiver, and/or some other hardware device configured for communication over a network such as a wide-area network (WAN), a local-area network (LAN), a private network (e.g., a Virtual Private Network (VPN)), the Internet, or a cellular communications network.

In some implementations, computer system(s) 1402 may be operatively coupled to or integrated with an automotive system, for example, the vehicle system depicted in FIG. 15 (discussed below). The automotive system may be manually operated, semi-autonomous, or fully autonomous. In such examples, input and output devices may include one or more image capture devices, controllers, microcontrollers, and/or other processors to control automotive functions such as acceleration, braking, and steering. In an automotive setting, the communication infrastructure 1412 may include a Controller Area Network (CAN) bus.

In some implementations, computer system(s) 1402 may be operatively coupled to a machine vision based system. Examples of machine based vision systems include manually operated, semi-autonomous, or fully autonomous industrial or agricultural robots, household robot, inspection systems, security systems, etc. As such, the embodiments described herein are not limited to one particular context and may be applicable to any application utilizing machine vision as well as other applications that involve use of image data.

Figure 15:
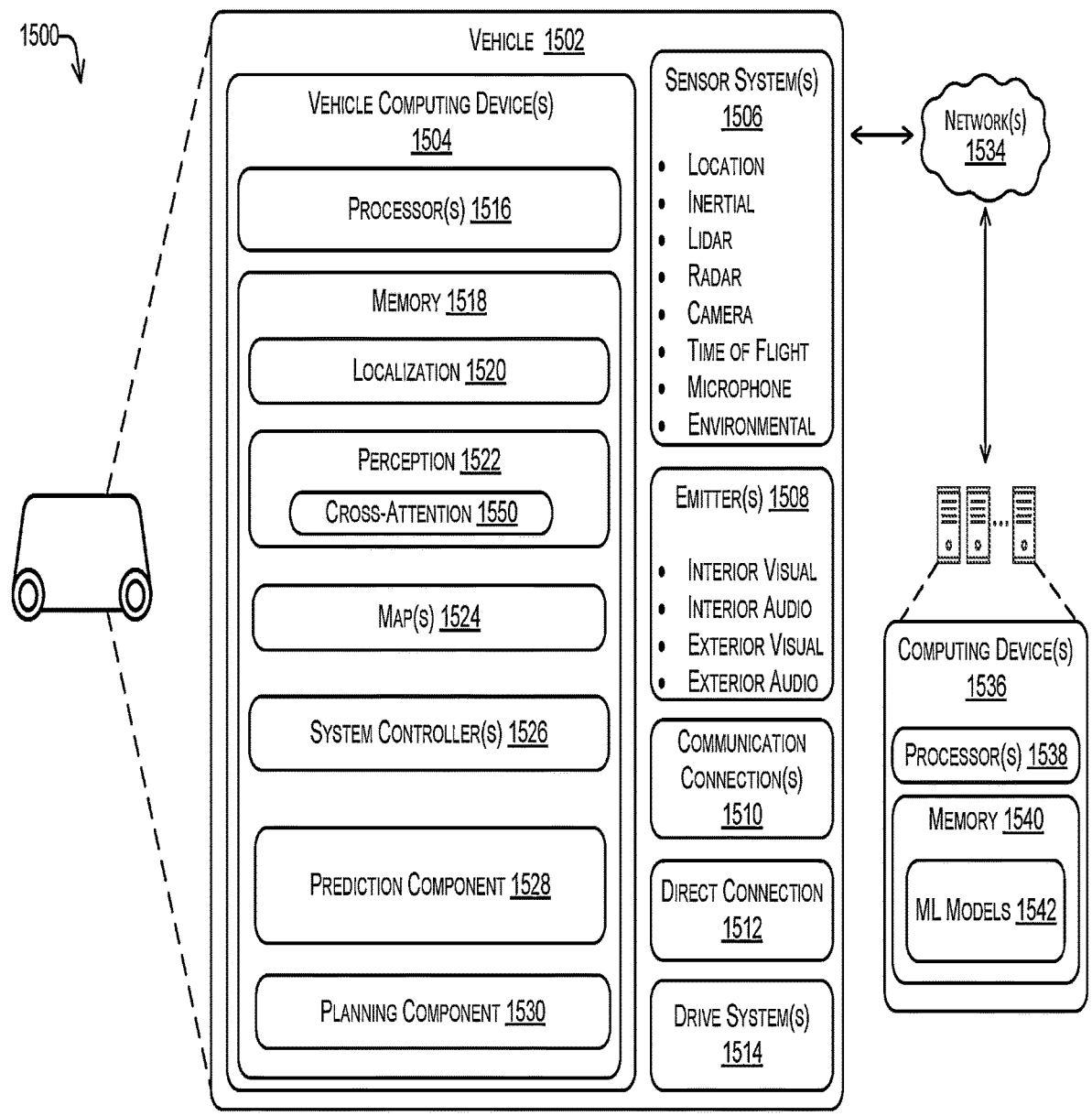
FIG. 15 is a block diagram illustrating an example architecture including a vehicle and a computing system, in accordance with one or more examples of the disclosure.

FIG. 15 illustrates a block diagram of an example system 1500 that implements the techniques discussed herein. In some instances, the example system 1500 may include a vehicle 1502, which may include one or of the machine learning components described above. In some instances, the vehicle 1502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 1502 may be a fully or partially autonomous vehicle having any other level or classification. Moreover, in some instances, the techniques described herein may be usable by non-autonomous vehicles as well.

The vehicle 1502 may include vehicle computing device(s) 1504, sensor(s) 1506, emitter(s) 1508, communication connection(s) 1510, at least one direct connection 1512 (e.g., for physically coupling with the vehicle to exchange data and/or to provide power), and one or more drive system(s) 1514. The sensors 1506 are configured to sense the environment around the vehicle 1502 and, in some instances, a state of the vehicle 1502 or conditions within an interior of the vehicle (e.g., cabin temperature or noise level).

In some instances, the sensor(s) 1506 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity/grey scale, depth, time of flight cameras, etc.), microphones, wheel encoders, environment sensors (e.g., thermometer, hygrometer, light sensors, pressure sensors,), etc. The sensor(s) 1506 may include multiple instances of each of these or other types of sensors. For instance, the radar sensors may include individual radar sensors located at the corners, front, back, sides, and/or top of the vehicle 1502. As another example, the cameras may include multiple cameras disposed at various locations about the exterior and/or interior of the vehicle 1502. The sensor(s) 1506 may provide input to the vehicle computing device(s) 1504 and/or to computing device(s) 1536.

One or more of these types of sensors may be phase-locked (i.e., capturing data corresponding to substantially the same portion of an environment of the vehicle at a substantially same time) or asynchronous. For example, camera(s), lidar(s), and radar(s) may operate in a phase-locked manner to capture data that at least partially overlaps in time. Alternatively, if the outputs of the camera(s) and lidar(s) and/or radar(s) are asynchronous, the outputs of these sensors may be processed to temporally align the sensor outputs. Such time-alignment can be performed, for example, using a perception component 1522.

The vehicle 1502 may also include emitter(s) 1508 for emitting light and/or sound, as described above. The emitter(s) 1508 in this example may include interior audio and visual emitter(s) to communicate with passengers of the vehicle 1502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners,), and the like. The emitter(s) 1508 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 1502 may also include communication connection(s) 1510 (e.g., one or more network interfaces) that enable communication between the vehicle 1502 and one or more other local or remote computing device(s). For instance, the communication connection(s) 1510 may facilitate communication with other local computing device(s) on the vehicle 1502 and/or the drive systems(s) 1514. Also, the communication connection(s) 1510 may additionally or alternatively allow the vehicle to communicate with other nearby computing device(s) (e.g., other nearby vehicles, traffic signals, etc.). The communication connection(s) 1510 may additionally or alternatively enable the vehicle 1502 to communicate with computing device(s) 1536. In some examples, computing device(s) 1536 may comprise one or more nodes of a distributed computing system (e.g., a cloud computing architecture).

The communication connection(s) 1510 may include physical and/or logical interfaces for connecting the vehicle computing device(s) 1504 to another computing device or a network, such as network(s) 1534. For example, the communication connection(s) 1510 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 1504 and/or the sensor(s) 1506 may send sensor data, via the network(s) 1534, to the computing device(s) 1536 at a particular frequency, after a lapse of a predetermined period of time, in near real-time, etc.

In some instances, the vehicle 1502 may include one or more drive systems(s) 1514 (or drive components). In some instances, the vehicle 1502 may have a single drive system 1514. In some instances, the drive system(s) 1514 may include one or more sensors to detect conditions of the drive system(s) 1514 and/or the surroundings of the vehicle 1502. By way of example and not limitation, the sensor(s) of the drive systems(s) 1514 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 1514. In some cases, the sensor(s) on the drive systems(s) 1514 may overlap or supplement corresponding systems of the vehicle 1502 (e.g., sensor(s) 1506).

The drive systems(s) 1514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC (heating, ventilation, and air conditioning) system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 1514 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 1514. Furthermore, the drive systems(s) 1514 may also include one or more communication connection(s) that enable communication by the respective drive component with one or more other local or remote computing device(s).

The vehicle computing device(s) 1504 may include processor(s) 1516 and memory 1518 communicatively coupled with the one or more processors 1516. Computing device(s) 1536 may also include processor(s) 1538, and/or memory 1540. The processor(s) 1516 and/or 1538 may be any suitable processor capable of executing instructions to process data and perform operations as described herein. By way of example and not limitation, the processor(s) 1516 and/or 1538 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 1518 and/or 1540 may be examples of non-transitory computer-readable media. The memory 1518 and/or 1540 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1518 and/or memory 1540 may store a localization component 1520, the perception component 1522, maps 1524, system controller(s) 1526, a prediction component 1528, and/or a planning component 1530.

In at least one example, the localization component 1520 may include hardware and/or software to receive data from the sensor(s) 1506 to determine a position, velocity, and/or orientation of the vehicle 1502 (e.g., one or more of an x-, y-, z-position, roll, pitch, or yaw). For example, the localization component 1520 may include map(s) of an environment and can continuously determine a location, velocity, and/or orientation of the autonomous vehicle within the map(s). In some instances, the localization component 1520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 1520 may provide data to various components of the vehicle 1502 to determine an initial position of an autonomous vehicle for generating a trajectory and/or for generating map data. In some examples, localization component 1520 may provide, to the planning component 1530 and/or to the prediction component 1528, a location and/or orientation of the vehicle 1502 relative to the environment and/or sensor data associated therewith.

The memory 1518 can further include one or more maps 1524 that can be used by the vehicle 1502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 1524 may include at least one map (e.g., images and/or a mesh) generated in accordance with the techniques discussed herein. In some examples, the vehicle 1502 can be controlled based at least in part on the maps 1524. That is, the maps 1524 can be used in connection with the localization component 1520, the perception component 1522, and/or the planning component 1530 to determine a location of the vehicle 1502, identify objects in an environment, and/or generate routes and/or trajectories to navigate within an environment.

In some instances, the perception component 1522 may comprise a primary perception system and/or a prediction system implemented in hardware and/or software. The perception component 1522 may detect object(s) in an environment surrounding the vehicle 1502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 1522 is referred to as perception data.

The perception component 1522 may include a cross-attention component 1550 configured to combine sensor data. For example, cross-attention component 1550 may implement a transformer-based fusion network, such as fusion network 130 described above, that uses an attention mechanism to determine a set of attention scores for combining sensor data into perception data (e.g., fused features from multiple sensor modalities). Alternatively or additionally, the perception data may include results of processing combined sensor data, e.g., 2D or 3D bounding boxes associated with objects. The prediction component 1528 can then use such perception data to make predictions about the object(s) in the environment.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 1528 can receive sensor data from the sensor system(s) 1506, map data, and/or perception data output from the perception component 1522 (e.g., processed sensor data), and can output predictions associated with one or more objects within the environment of the vehicle 1502. For example, prediction component 1528 may include one or more machine learning models configured to predict trajectories of objects and/or make other predictions about object movement relative to the vehicle 1502.

The planning component 1530 may receive a location and/or orientation of the vehicle 1502 from the localization component 1520, perception data from the perception component 1522, and/or predictions from the prediction component 1528, and may determine instructions for controlling operation of the vehicle 1502 based at least in part on any of this data.

For example, the planning component 1530 may use predictions from the prediction component 1528 to determine an action to be performed by the vehicle 1502 (an acceleration maneuver, a steering maneuver, a braking maneuver, a change in vehicle trajectory, etc.). Upon determining the action to be performed, the planning component 1530 may communicate the action to the drive system(s) 1514 to control the vehicle accordingly.

In some examples, the instructions determined by the planning component 1530 are determined based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 1526 and/or drive systems(s) 1514 may parse/cause to be carried out, second instructions for the emitter(s) 1508 may be formatted according to a second format associated therewith). In at least one example, the planning component 1530 may comprise a nominal trajectory generation subcomponent that generates a set of candidate trajectories, and selects a trajectory for implementation by the drive systems(s) 1514 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated by reference herein for all purposes.

The memory 1518 and/or 1540 may additionally or alternatively store a mapping system (e.g., generating a map based at least in part on sensor data), a ride management system, etc. Although localization component 1520, perception component 1522, the prediction component 1528, the planning component 1530, and/or system controller(s) 1526 are illustrated as being stored in memory 1518, any of these components may include processor-executable instructions, machine-learned model(s) (e.g., a neural network), and/or hardware and all or part of any of these components may be stored on memory 1540 or configured as part of computing device(s) 1536.

As described herein, the localization component 1520, the perception component 1522, the prediction component 1528, the planning component 1530, and/or other components of the system 1500 may comprise one or more ML models. For example, the localization component 1520, the perception component 1522, the prediction component 1528, and/or the planning component 1530 may each comprise different ML model pipelines. The prediction component 1528 may use a different ML model or a combination of different ML models in different circumstances. For example, the prediction component 1528 may use different graph neural networks (GNNs), RNNs, CNNs, multilayer perceptrons (MLPs) and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 1518 may additionally or alternatively store one or more system controller(s) 1526, which may be configured to control steering, propulsion, braking, safety, emitters, communication, and other systems of the vehicle 1502. These system controller(s) 1526 may communicate with and/or control corresponding systems of the drive systems(s) 1514 and/or other components of the vehicle 1502.

In an additional or alternate example, vehicle 1502 and/or computing device(s) 1536 may communicate (e.g., transmit and/or receive messages over network(s) 1534) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 1502. For example, the passenger device may additionally or alternatively comprise a display and/or one or more input/output devices, such as a touchscreen, microphone, speaker, and/or the like. In some examples, the vehicle 1502 may transmit messages and/or receive messages from the passenger device.

In some instances, communication connection(s) 1510 may establish a communication link(s) between the vehicle 1502 and one or more vehicles. The communication link can be established over the network(s) 1534, e.g., wireless general data networks, such as a Wi-Fi network, and/or telecommunications networks such as, for example, cellular communication networks or satellite networks. The vehicle 1502 may use the communication link(s) for various purposes, including transmitting sensor data and/or a result of processing sensor data to another vehicle, or vice versa. Thus, sensor data may be captured at a first vehicle (e.g., vehicle 1502) and transmitted to a second vehicle or to a remote computing system (e.g., computing device(s) 1536) for processing. Likewise, the results of processing sensor data (e.g., bounding boxes or other data representative of objects in the environment around the capturing vehicle) may be communicated between vehicles or between the remote computing system and a vehicle. For example, the computing device(s) 1536 may be configured to combine sensor data from different sensors 1506 and/or to detect objects using combined sensor data. Thus, the methods described herein can be performed through local processing at a vehicle (e.g., using perception component 1522), remote processing, or a combination of local and remote processing.

It should be noted that while FIG. 15 is illustrated as a distributed system, in alternative examples, components of the vehicle 1502 may be associated with the computing device(s) 1536 and/or components of the computing device (s) 1536 may be associated with the vehicle 1502. That is, the vehicle 1502 may perform one or more of the functions associated with the computing device(s) 1536, and vice versa.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein. Variations of those embodiments may become apparent to those of ordinary skill in the art upon reading the foregoing description. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. The specification and drawings are, accordingly, to be regarded in an illustrative rather than a restrictive sense. It will, however, be evident that various modifications and changes may be made thereunto without departing from the broader spirit and scope of the disclosure as set forth in the following claims.

What is claimed is:

1. A system comprising:
   one or more processors; and
   non-transitory memory storing instructions that, when executed, cause the one or more processors to perform operations comprising:
   generating, using a first dataset representing data captured by one of a lidar sensor or a radar sensor, first query vectors for input to a first transformer-based machine learning (ML) model;
   combining, through executing the first transformer-based ML model, the first dataset with a second dataset representing data captured by a camera, wherein the first transformer-based ML model is configured to:
      compute first scores based on the first query vectors and keys derived from the second dataset, and
      generate a first combined dataset through applying the first scores to values derived from the second dataset;
   generating, using a third dataset representing data captured by the other of the lidar sensor or the radar sensor, second query vectors for input to a second transformer-based ML model;
   inputting the second query vectors and the first combined dataset into the second transformer-based ML model;
   combining, through executing the second transformer-based ML model, the first combined dataset with the third dataset, wherein the second transformer-based ML model is configured to:
      compute second scores based on the second query vectors and keys derived from the first combined dataset, and
      generate a second combined dataset through applying the second scores to values derived from the first combined dataset; and
   determining a three-dimensional boundary of one or more objects using the second combined dataset.

2. The system of claim 1, wherein generating the first query vectors comprises:
   generating a query dataset using the first dataset and the second dataset, wherein the query dataset is formatted according to a data space of the first dataset; and computing the first query vectors using a subset of the query dataset.

3. The system of claim 2, wherein generating the query dataset comprises:
performing inverse perspective mapping on the second dataset to convert the second dataset to the data space of the first dataset; and
combining, using element-wise concatenation or element-wise summation, the first dataset and the converted second dataset.

4. The system of claim 2, wherein generating the query dataset comprises:
collapsing the second dataset along a height dimension into a condensed dataset; and
generating the query dataset through executing a third transformer-based ML model, using values derived from the condensed dataset and query vectors derived from the first dataset.

5. The system of claim 1, wherein generating the first query vectors comprises:
computing a heatmap representing different object classes, wherein the heatmap comprises scores indicating a likelihood of objects belonging to the object classes being present at specific locations in a query dataset, and wherein the query dataset is the first dataset or a combination of the first dataset and the second dataset;
identifying top-scoring locations in the query dataset from the heatmap; and
computing the first query vectors from data associated with the top-scoring locations.

6. A computer-implemented method, comprising:
generating, using a first dataset representing data captured by a first sensor, first query vectors for input to a first transformer-based machine learning (ML) model;
combining, through executing the first transformer-based ML model, the first dataset with a second dataset representing data captured by a second sensor of a different modality than the first sensor, wherein the first transformer-based ML model is configured to:
compute first scores based on the first query vectors, and
generate a first combined dataset through applying the first scores to values derived from the second dataset;
generating, using a third dataset representing data captured by a third sensor of a different modality than the first sensor and the second sensor, second query vectors for input to a second transformer-based ML model;
inputting the second query vectors and the first combined dataset into the second transformer-based ML model;
combining, through executing the second transformer-based ML model, the first combined dataset with the third dataset, wherein the second transformer-based ML model is configured to:
compute second scores based on the second query vectors, and
generate a second combined dataset through applying the second scores to values derived from the first combined dataset; and
determining a three-dimensional boundary of one or more objects using the second combined dataset.

7. The computer-implemented method of claim 6, wherein generating the first query vectors comprises:
generating a query dataset using the first dataset and the second dataset, wherein the query dataset is formatted according to a data space of the first dataset; and
computing the first query vectors using a subset of the query dataset.

8. The computer-implemented method of claim 7, wherein generating the query dataset comprises:
performing inverse perspective mapping on the second dataset to convert the second dataset to the data space of the first dataset; and
combining, using element-wise concatenation or element-wise summation, the first dataset and the converted second dataset.

9. The computer-implemented method of claim 7, wherein generating the query dataset comprises:
collapsing the second dataset along a height dimension into a condensed dataset; and
generating the query dataset through executing a third transformer-based ML model, using values derived from the condensed dataset and query vectors derived from the first dataset.

10. The computer-implemented method of claim 6, wherein generating the first query vectors comprises:
computing a heatmap representing different object classes, wherein the heatmap comprises scores indicating a likelihood of objects belonging to the object classes being present at specific locations in a query dataset, and wherein the query dataset is the first dataset or a combination of the first dataset and the second dataset;
identifying top-scoring locations in the query dataset from the heatmap; and
computing the first query vectors from data associated with the top-scoring locations.

11. The computer-implemented method of claim 6, further comprising:
generating the first query vectors through applying a first set of weights to a first query dataset, wherein the first query dataset is the first dataset or a combination of the first dataset and the second dataset;
generating first key vectors through applying a second set of weights to the second dataset; and
generating first value vectors through applying a third set of weights to the second dataset.

12. The computer-implemented method of claim 11, further comprising:
generating the second query vectors through applying the first set of weights to a second query dataset, wherein the second query dataset is the third dataset or a combination of the third dataset and the second dataset;
generating second key vectors through applying the second set of weights to the first combined dataset; and
generating second value vectors through applying the third set of weights to the first combined dataset.

13. The computer-implemented method of claim 11, wherein:
the first scores correspond to a dot-product of the first query vectors and the first key vectors, and
to generate the first combined dataset, the first transformer-based ML model is configured to compute a dot-product of the first scores and the first value vectors.

14. The computer-implemented method of claim 11, wherein the first set of weights, the second set of weights, and the third set of weights were obtained through joint training of the first transformer-based ML model and the second transformer-based ML model, using training data having manually labeled bounding boxes.

15. The computer-implemented method of claim 6, wherein determining the three-dimensional boundary of the one or more objects comprises processing the second combined dataset through a feed forward neural network.

16. The computer-implemented method of claim 6, further comprising:
generating the first dataset through processing the data captured by the first sensor using a first convolutional neural network;
generating the second dataset through processing the data captured by the second sensor using a second convolutional neural network; and
generating the third dataset through processing the data captured by the third sensor using a third convolutional neural network.

17. The computer-implemented method of claim 6, wherein the data captured by the first sensor is a two-dimensional image, and wherein the data captured by the second sensor is a point cloud.

18. The computer-implemented method of claim 6, further comprising:
determining an action to be performed by an autonomous vehicle based on the three-dimensional boundary of the one or more objects.

19. A non-transitory computer-readable medium storing program code, the program code including instructions that, when executed by one or more processors, cause the one or more processors to perform operations comprising:
generating, using a first dataset representing data captured by a first sensor, first query vectors for input to a first transformer-based machine learning (ML) model;
combining, through executing the first transformer-based ML model, the first dataset with a second dataset representing data captured by a second sensor of a different modality than the first sensor, wherein the first transformer-based ML model is configured to:
compute first scores based on the first query vectors, and
generate a first combined dataset through applying the first scores to values derived from the second dataset;
generating, using a third dataset representing data captured by a third sensor of a different modality than the first sensor and the second sensor, second query vectors for input to a second transformer-based ML model;
inputting the second query vectors and the first combined dataset into the second transformer-based ML model;
combining, through executing the second transformer-based ML model, the first combined dataset with the third dataset, wherein the second transformer-based ML model is configured to:
compute second scores based on the second query vectors, and
generate a second combined dataset through applying the second scores to values derived from the first combined dataset; and
determining a three-dimensional boundary of one or more objects using the second combined dataset.

20. The non-transitory computer-readable medium of claim 19, wherein the instructions further cause the one or more processors to perform operations comprising:
computing a heatmap representing different object classes, wherein the heatmap comprises scores indicating a likelihood of objects belonging to the object classes being present at specific locations in a query dataset, and wherein the query dataset is the first dataset or a combination of the first dataset and the second dataset;
identifying top-scoring locations in the query dataset from the heatmap; and
computing the first query vectors from data associated with the top-scoring locations.

\* \* \* \* \*